(12) United States Patent
Nishida

(10) Patent No.: US 8,352,142 B2
(45) Date of Patent: Jan. 8, 2013

(54) BRAKE CONTROL APPARATUS AND BRAKE CONTROL METHOD

(75) Inventor: Shinichiro Nishida, Zama (JP)

(73) Assignee: Hitachi, Ltd., Tokyo (JP)

( * ) Notice: Subject to any disclaimer, the term of this patent is extended or adjusted under 35 U.S.C. 154(b) by 491 days.

(21) Appl. No.: 12/487,102

(22) Filed: Jun. 18, 2009

(65) Prior Publication Data

US 2009/0326775 A1    Dec. 31, 2009

(30) Foreign Application Priority Data

Jun. 25, 2008    (JP) .................................. 2008-165289

(51) Int. Cl.
*B60T 7/12* (2006.01)

(52) U.S. Cl. .................. 701/70; 701/71; 701/83; 303/5; 303/8; 303/9; 303/9.61; 303/9.73; 303/10; 303/11; 303/125; 303/145; 303/155; 303/175; 303/161; 303/166; 303/113.4; 303/116.1; 303/28; 303/57; 303/68; 303/71; 303/83

(58) Field of Classification Search .................. None
See application file for complete search history.

(56) References Cited

U.S. PATENT DOCUMENTS

| | | | | | |
|---|---|---|---|---|---|
| 5,447,363 | A | * | 9/1995 | Fukamachi | 303/125 |
| 5,586,814 | A | * | 12/1996 | Steiner | 303/116.2 |
| 5,779,329 | A | * | 7/1998 | Takeshima | 303/155 |
| 5,941,608 | A | * | 8/1999 | Campau et al. | 303/113.4 |
| 5,967,624 | A | * | 10/1999 | Graber et al. | 303/113.4 |
| 6,010,198 | A | * | 1/2000 | Nakazawa | 303/113.1 |
| 6,079,799 | A | * | 6/2000 | Sawada et al. | 303/146 |
| 6,164,731 | A | * | 12/2000 | Nakazawa et al. | 303/116.1 |
| 6,168,245 | B1 | * | 1/2001 | Siegel et al. | 303/115.4 |
| 6,183,050 | B1 | * | 2/2001 | Ganzel | 303/114.1 |
| 6,193,330 | B1 | * | 2/2001 | Soga et al. | 303/155 |
| 6,195,995 | B1 | * | 3/2001 | Bartsch | 60/564 |
| 6,199,958 | B1 | * | 3/2001 | Baechle | 303/10 |
| 6,206,484 | B1 | * | 3/2001 | Ganzel | 303/113.4 |
| 6,217,133 | B1 | * | 4/2001 | Yoshida | 303/113.4 |
| 6,227,629 | B1 | * | 5/2001 | Yoshida et al. | 303/155 |
| 6,283,558 | B1 | * | 9/2001 | Volz et al. | 303/113.1 |
| 6,290,310 | B1 | * | 9/2001 | Kusano | 303/122.11 |
| 6,312,065 | B1 | * | 11/2001 | Freitag et al. | 303/187 |
| 6,318,817 | B1 | * | 11/2001 | Martin et al. | 303/116.1 |
| 6,328,389 | B1 | * | 12/2001 | Yotsuya et al. | 303/113.3 |
| 6,334,655 | B2 | * | 1/2002 | Tanaka et al. | 303/113.4 |

(Continued)

FOREIGN PATENT DOCUMENTS

JP    2006-159949 A    6/2006

*Primary Examiner* — Jonathan M Dager
(74) *Attorney, Agent, or Firm* — Foley & Lardner LLP

(57) ABSTRACT

A brake control apparatus includes: a master cylinder; a wheel cylinder; a hydraulic pressure source; a control valve arranged to increase or reduce the pressure of the wheel cylinder; an outside gate valve arranged to connect or disconnect between the master cylinder and the wheel cylinder; a brake operation sensing section configured to sense a driver's brake operation; and a control unit configured to control the hydraulic pressure source, the control valve, and the outside gate valve, to perform an automatic-brake pressure-increasing control to control the outside gate valve in a valve closing direction, to drive the hydraulic pressure source, and thereby to increase the pressure of the wheel cylinder in accordance with a vehicle condition, and to increase a driving quantity of the hydraulic pressure source when the brake operation is sensed during the automatic-brake pressure-increasing control.

5 Claims, 14 Drawing Sheets

U.S. PATENT DOCUMENTS

| | | | |
|---|---|---|---|
| 6,347,843 B1* | 2/2002 | Murayama et al. | 303/116.1 |
| 6,460,944 B2* | 10/2002 | Isono et al. | 303/159 |
| 6,547,342 B1* | 4/2003 | Schaust et al. | 303/114.1 |
| 6,557,950 B2* | 5/2003 | Ishida et al. | 303/20 |
| 6,702,402 B1* | 3/2004 | Sawada et al. | 303/113.1 |
| 6,824,227 B1* | 11/2004 | Kiesewetter et al. | 303/155 |
| 6,851,760 B2* | 2/2005 | Ishida et al. | 303/11 |
| 7,244,002 B2* | 7/2007 | Tsunehara | 303/116.2 |
| 7,527,339 B2* | 5/2009 | Iizuka et al. | 303/11 |
| 2002/0125764 A1* | 9/2002 | Sakamoto | 303/9.63 |
| 2002/0133284 A1* | 9/2002 | Manaka et al. | 701/70 |
| 2003/0205929 A1* | 11/2003 | Imamura et al. | 303/11 |
| 2004/0017106 A1* | 1/2004 | Aizawa et al. | 303/191 |
| 2004/0024513 A1* | 2/2004 | Aizawa et al. | 701/70 |
| 2004/0215385 A1* | 10/2004 | Aizawa et al. | 701/93 |
| 2005/0001473 A1* | 1/2005 | Messner | 303/89 |
| 2005/0006947 A1* | 1/2005 | Messner | 303/11 |
| 2006/0087173 A1* | 4/2006 | Kajiyama et al. | 303/3 |
| 2006/0119173 A1* | 6/2006 | Kokubo | 303/16 |
| 2006/0212207 A1* | 9/2006 | Sugano et al. | 701/93 |
| 2008/0054716 A1* | 3/2008 | Sato et al. | 303/16 |
| 2008/0061624 A1* | 3/2008 | Knechtges et al. | 303/11 |
| 2008/0106142 A1* | 5/2008 | Nishino et al. | 303/10 |
| 2008/0120004 A1* | 5/2008 | Nakada et al. | 701/70 |
| 2008/0319624 A1* | 12/2008 | Aizawa et al. | 701/70 |
| 2011/0004385 A1* | 1/2011 | Ishimoto | 701/70 |

\* cited by examiner

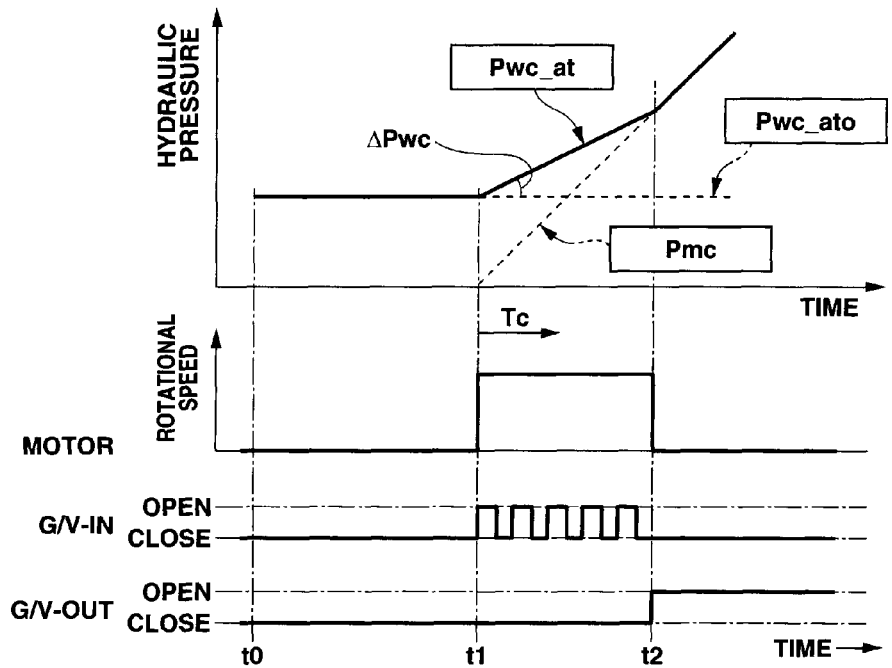
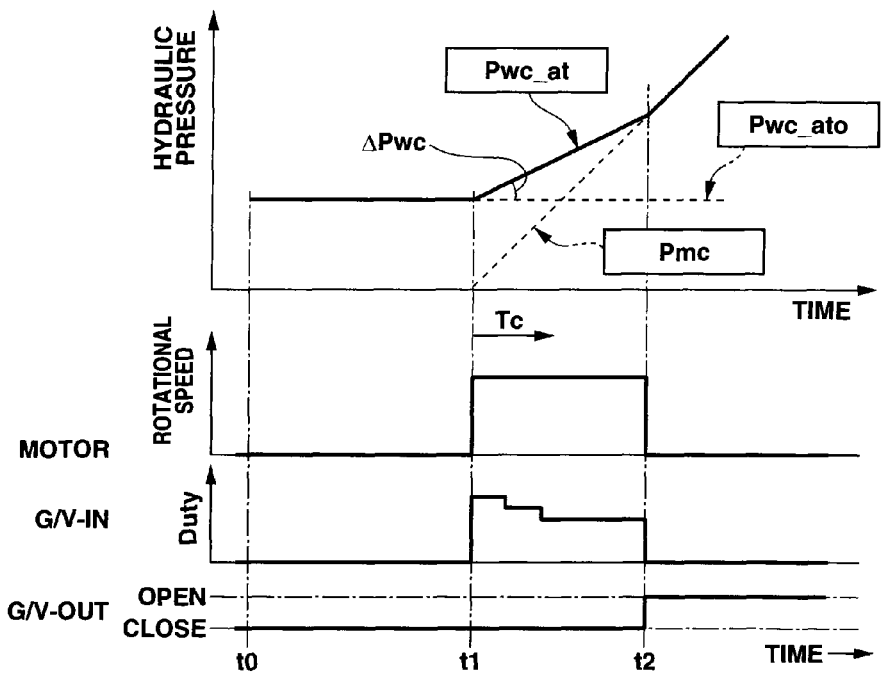

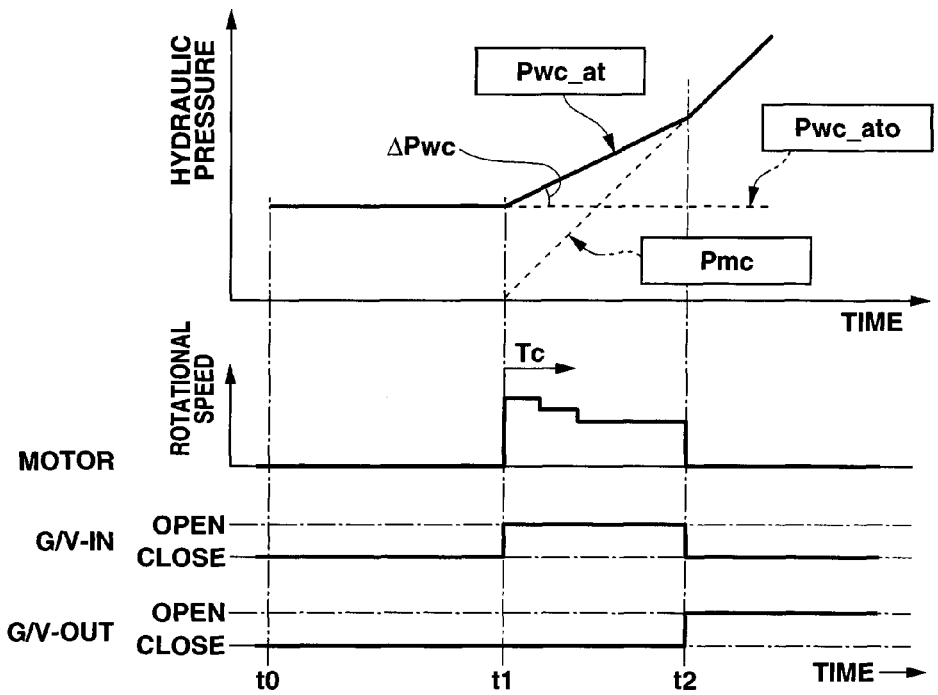
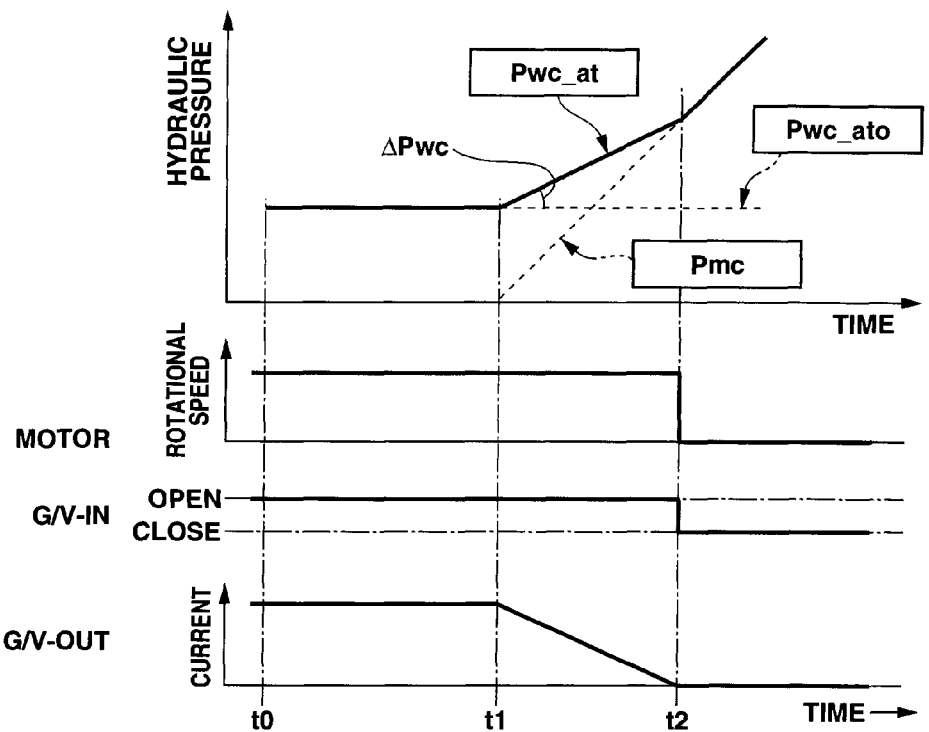

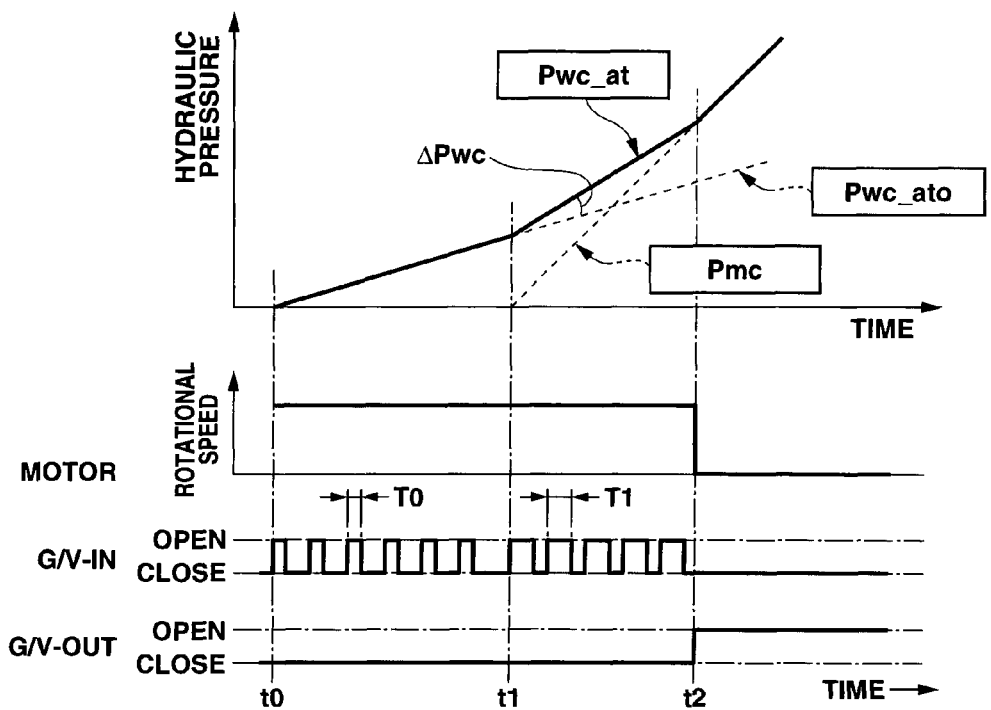
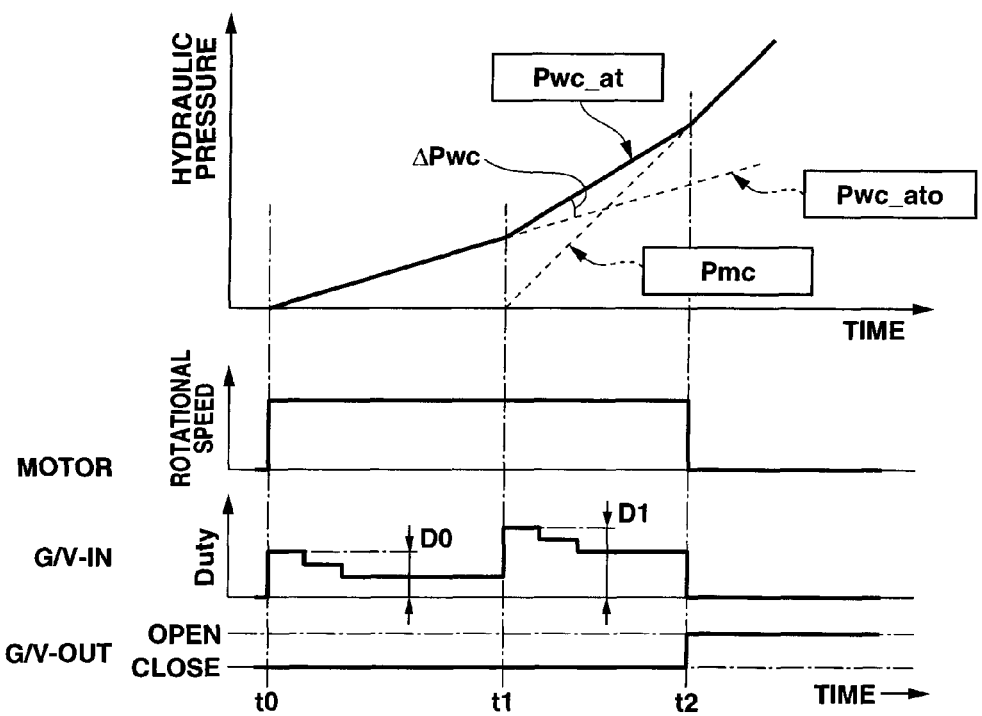

BRAKE CONTROL APPARATUS AND BRAKE CONTROL METHOD

BACKGROUND OF THE INVENTION

This invention relates to a brake control apparatus and a brake control method which are configured to increase a pressure of a wheel cylinder by a pump.

US Patent Application Publication No. 2006-0119173 (corresponding to Japanese Patent Application Publication No. 2006-159949) discloses a brake control apparatus including a pump arranged to increase pressures of wheel cylinders not by intension of a driver. The brake control apparatus is arranged to perform an automatic brake control such as an anti skid control, a vehicle behavior control, and an inter-vehicular distance control (following-distance control).

In this brake control apparatus, the wheel cylinder pressures are larger than the master cylinder pressures during the automatic brake control by increasing the pressure by the pump. In this state, when the brake pedal is depressed, the hydraulic fluid within the master cylinder is not discharged. Accordingly, the brake pedal does not perform the stroke or does not move. It becomes a stiff brake pedal state in which the driver may feel like depressing a hard or stiff plate (in which the brake pedal stroke is hardly caused when the brake pedal is depressed). Accordingly, the brake control apparatus includes a reservoir arranged to absorb the hydraulic fluid discharged from the master cylinder, and a cut valve arranged to connect or disconnect between the reservoir and the master cylinder. When brake pedal BP is depressed during the pressure increase by the pump, the cut valve is opened to connect the master cylinder and the reservoir. With this, the pedal stroke is ensured by discharging the hydraulic fluid by the pedal stroke operation when it becomes a brake override state in which the brake pedal is depressed during the brake control.

SUMMARY OF THE INVENTION

However, in the above-mentioned conventional apparatus, it is necessary to provide a cut valve and a reservoir, and the number of the components is increased.

It is, therefore, an object of the present invention to provide a brake control apparatus devised to ensure the pedal stroke in the brake override state, and to suppress the increase of the number of components.

According to one aspect of the present invention, a brake control apparatus comprises: a master cylinder; a wheel cylinder; a hydraulic pressure source arranged to supply a hydraulic fluid sucked from the master cylinder to the wheel cylinder, and to increase a pressure of the wheel cylinder; a control valve arranged to increase or reduce the pressure of the wheel cylinder; an outside gate valve arranged to connect or disconnect between the master cylinder and the wheel cylinder; a brake operation sensing section configured to sense a driver's brake operation; and a control unit configured to control the hydraulic pressure source, the control valve, and the outside gate valve, to perform an automatic-brake pressure-increasing control to control the outside gate valve in a valve closing direction, to drive the hydraulic pressure source, and thereby to increase the pressure of the wheel cylinder in accordance with a vehicle condition, and to increase a driving quantity of the hydraulic pressure source when the brake operation is sensed during the automatic-brake pressure-increasing control.

According to another aspect of the invention, a brake control apparatus comprises: a master cylinder; a wheel cylinder; a hydraulic pressure source arranged to supply a hydraulic fluid sucked from the master cylinder to the wheel cylinder, and to increase a pressure of the wheel cylinder; a control valve arranged to increase or reduce the pressure of the wheel cylinder; an outside gate valve arranged to connect or disconnect between the master cylinder and the wheel cylinder; an inside gate valve provided between the master cylinder and a suction portion of the hydraulic pressure source; a brake operation sensing section configured to sense a driver's brake operation; a control unit configured to control the hydraulic pressure source, the control valve, the inside gate valve, and the outside gate valve, to perform an automatic-brake pressure-increasing control to open the inside gate valve by a predetermined valve opening degree, to control a valve opening degree of the outside gate valve, to drive the hydraulic pressure source, and thereby to increase the pressure of the wheel cylinder in accordance with a vehicle condition, and to increase the valve opening degree of the inside gate valve or a driving quantity of the hydraulic pressure source when the brake operation is sensed during the automatic-brake pressure-increasing control.

According to still another aspect of the invention, a brake control apparatus comprises: a master cylinder; a wheel cylinder; a hydraulic pressure source arranged to supply a hydraulic fluid sucked from the master cylinder to the wheel cylinder, and to increase a pressure of the wheel cylinder; a control valve arranged to increase or reduce the pressure of the wheel cylinder; an outside gate valve arranged to connect or disconnect between the master cylinder and the wheel cylinder; an inside gate valve provided between the master cylinder and a suction portion of the hydraulic pressure source; a brake operation sensing section configured to sense a driver's brake operation; a control unit configured to control the hydraulic pressure source, the control valve, the inside gate valve, and the outside gate valve, to perform an automatic-brake pressure-holding control to close the inside gate valve and the outside gate valve, to stop the hydraulic pressure source, and to hold the pressure of the wheel cylinder in accordance with a vehicle condition, and to open the inside gate valve, to drive the hydraulic pressure source, and thereby to suck the hydraulic fluid in the master cylinder when the brake operation is sensed during the automatic-brake pressure-holding control.

According to still another aspect of the invention, a brake control apparatus comprises: a master cylinder; a wheel cylinder; a hydraulic pressure source arranged to supply a hydraulic fluid sucked from the master cylinder to the wheel cylinder, and to increase a pressure of the wheel cylinder; a control valve arranged to increase or reduce the pressure of the wheel cylinder; an outside gate valve arranged to connect or disconnect between the master cylinder and the wheel cylinder; an inside gate valve provided between the master cylinder and a suction portion of the hydraulic pressure source; a brake operation sensing section configured to sense a driver's brake operation; a control unit configured to control the hydraulic pressure source, the control valve, the inside gate valve, and the outside gate valve, to perform an automatic-brake pressure-reducing control to open the outside gate valve, to stop the hydraulic pressure source, and thereby to reduce the pressure of the wheel cylinder in accordance with a vehicle condition, and to open the inside gate valve, to drive the hydraulic pressure source, and thereby to suck the hydraulic fluid in the master cylinder when the brake operation is sensed during the automatic-brake pressure-reducing control.

According to still another aspect of the invention, a brake control method comprises: performing an automatic brake control including a pressure increasing control to suck a hydraulic fluid from a master cylinder at least by a hydraulic pressure source, and to increase a pressure of a wheel cylinder by the hydraulic fluid from the master cylinder in accordance with a vehicle condition, a pressure holding control to hold the increased pressure of the wheel cylinder, and a pressure reducing control to reduce the pressure of the wheel cylinder; sensing a driver's further depression during the automatic brake control; and flowing the hydraulic fluid in the master cylinder to the wheel cylinder when the further depression is sensed during the automatic brake control.

BRIEF DESCRIPTION OF THE DRAWINGS

FIG. 9 is a time chart of a stroke ensuring control during the pressure holding by the automatic brake control (control of a valve opening time period of an inside gate valve (ON/OFF valve).

FIG. 10 is a time chart of the stroke ensuring control during the pressure holding by the automatic brake control (control of a valve opening degree of the inside gate valve (proportional valve)).

FIG. 11 is a time chart of the stroke ensuring control during the pressure holding by the automatic brake control (control of a rotational speed of a motor).

FIG. 12 is a time chart of the stroke ensuring control during the pressure holding by the automatic brake control (control of an outside gate valve) in a second embodiment of the present invention.

FIG. 13 is a time chart of the stroke ensuring control during a pressure increase by the automatic brake control (control of a valve opening time period of the inside gate valve (ON/OFF valve).

FIG. 14 is a time chart of the stroke ensuring control during the pressure increase by the automatic brake control (control of a valve opening degree of the inside gate valve (proportional valve)).

DETAILED DESCRIPTION OF THE INVENTION

[Hydraulic Circuit]

Figure 1:
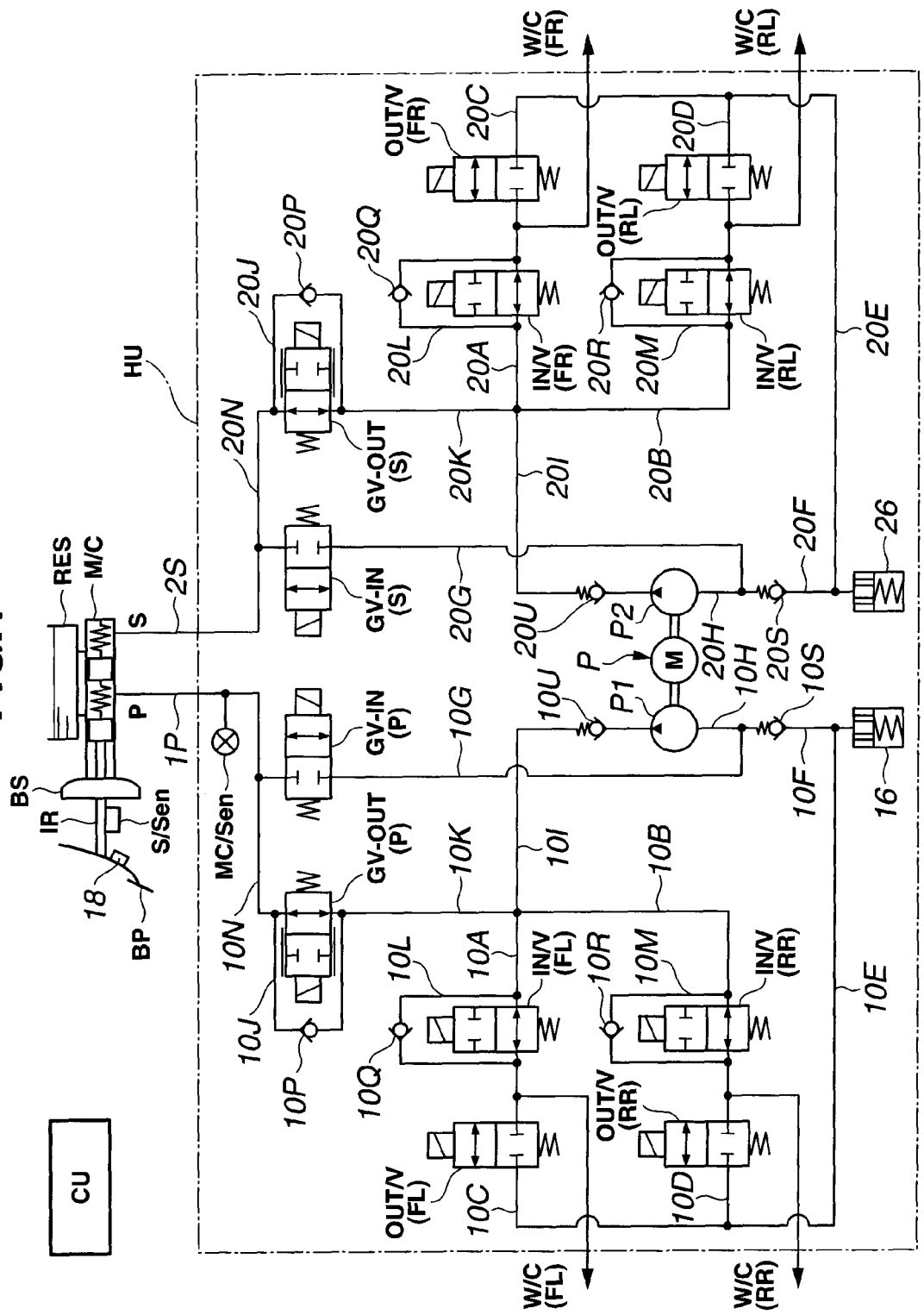
FIG. 1 is a hydraulic circuit of a brake control apparatus according to a first embodiment of the present invention.

FIG. 1 is a hydraulic circuit of a brake control apparatus according to a first embodiment of the present invention. A hydraulic unit HU is connected with wheel cylinders W/C and master cylinders M/C. A control unit CU controls solenoid valves and a motor M within hydraulic unit HU. Control unit CU receives detection values of sensors.

A brake circuit is separated into two systems of a P system including a brake circuit 1P, and an S system including a brake circuit 2S. Brake circuit 1P is connected with a wheel cylinder W/C (FL) of a left front wheel and a wheel cylinder W/C (FR) of a right rear wheel. Brake circuit 2S is connected with a wheel cylinder W/C (FR) of a right front wheel and a wheel cylinder W/C (RL) of a left rear wheel. That is, the brake circuit has an X-piping system. The brake circuit is not limited to the X-piping system.

A brake pedal BP transmits a depression operation of a driver through a booster BS and an input rod IR to a master cylinder M/C. Brake pedal BP is provided with a brake switch 18 arranged to sense the brake operation of the driver, and a stroke sensor S/Sen arranged to sense a stroke S.

Master cylinder M/C is a tandem type. Master cylinder M/C includes two hydraulic chambers separated within the cylinder by two master cylinder pistons arranged in the forward and rearward directions. The two cylinders receive the hydraulic fluid from a reservoir tank RES. One of the hydraulic chambers is connected with brake circuit 1P. The other of the hydraulic chambers is connected with brake circuit 2S.

Master cylinder M/C generates a hydraulic pressure (master cylinder pressure Pmc) within the two hydraulic chambers in accordance with the depression quantity of brake pedal BP when brake pedal BP is depressed. This master cylinder pressure Pmc is supplied to brake circuits 1P and 2S.

Cup-shaped sealing members are provided on an outer circumference of each of the master cylinder pistons. At the piston stroke, the sealing members shut off connections between the hydraulic chambers and reservoir tank RES, so that it becomes possible to pressurize the hydraulic chambers.

In this case, the hydraulic fluid is not supplied from reservoir tank RES to brake circuits 1P and 2S. The hydraulic fluid is supplied only from the hydraulic chambers of master cylinder M/C to brake circuits 1P and 2S.

On the other hand, when brake pedal BP is returned, the master cylinder pistons are returned by return springs provided within the hydraulic chambers. In this case, the hydraulic chambers of master cylinder M/C are connected with reservoir tank RES by the structures of the sealing members.

Consequently, it is possible to supply the hydraulic fluid of reservoir tank RES to the hydraulic chambers of master cylinder M/C again.

In a way from master cylinder M/C side (an upstream side) to wheel cylinder W/C side (a downstream side) of brake circuit 1P, there is provided an outside gate valve GV-OUT (P) which is a normally open proportional solenoid valve. In brake circuit 1P, there is provided a hydraulic passage 10J in parallel with outside gate valve GV-OUT (P).

In hydraulic passage 10J, there is provided a check valve 10P arranged to prevent a flow of the hydraulic fluid from the downstream side to the upstream side. Hereinafter, brake circuit 1P on the upstream side of outside gate valve GV-OUT (P) is a brake circuit 10N, and brake circuit 1P on the downstream side of outside gate valve GV-OUT (P) is a brake circuit 10K.

Brake circuit 10K is bifurcated into brake circuits 10A and 10B. Brake circuits 10A and 10B are connected, respectively, with wheel cylinders W/C (FL, RR). In brake circuits 10A and 10B, there are provided, respectively, pressure increasing valves (FL, RR) which are normally open solenoid valves.

Brake circuit 10A is connected with a hydraulic passage 10L in parallel with pressure increasing valve IN/V (FL). In hydraulic passage 10L, there is provided a check valve 10Q arranged to prevent a flow of the hydraulic fluid from the upstream side to the downstream side. Similarly, brake circuit 10B is connected with a hydraulic passage 10M in parallel with pressure increasing valve IN/V (RR). In hydraulic passage 10M, there is provided a check valve 10R arranged to prevent a flow of the hydraulic fluid from the upstream side to the downstream side.

Brake circuits 10A and 10B on the downstream sides of pressure increasing valves IN/V (FL, RR) are connected, respectively, with return circuits 10C and 10D. Return circuits 10C and 10D are provided, respectively, with pressure reducing valves or pressure decreasing valves OUT/V (FL, RR) which are normally closed on/off solenoid valves. Return circuits 10C and 10D are confluent with each other to form return circuit 10E. Return circuit 10E is connected with reservoir 16 provided within hydraulic unit HU.

On the other hand, brake circuit 10N on the upstream side of outside gate valve GV-OUT (P) is connected with an suction circuit 10G. In suction circuit 10G, there is provided an inside gate valve GV-IN (P) which is a normally closed on/off solenoid valve arranged to switch connection/disconnection (shut-off) of induction circuit 10G. Induction circuit 10G is confluent with return circuit 10F from reservoir 16 to form an induction circuit 10H.

Hydraulic unit HU includes a pump P arranged to serve as a hydraulic source other than master cylinder M/C, and to suck or discharge the hydraulic fluid. Pump P is a gear pump operated by motor M. Pump P includes a first pump P1 (P system) and a second pump (S system).

The suction side of first pump P1 is connected with suction circuit 10H. The discharge side of first pump P1 is connected with a discharge circuit 10I, and connected through discharge circuit 10I to brake circuit 10K.

In return circuit 10F, there is provided a check valve 10S arranged to prevent a flow of the hydraulic fluid from suction circuit 10G (inside gate valve GV-IN (P)) to reservoir 16.

In discharge circuit 10I, there is provided a check valve 10U arranged to prevent a flow of the hydraulic fluid from brake circuit 10K (outside gate valve GV-OUT (P)) or brake circuits 10A and 10B (wheel cylinders W/C) to first pump P1 (the discharge side).

The hydraulic circuit of brake circuit 2S is identical in structure to the hydraulic circuit of brake circuit 1P. In brake circuit 10N on the upstream side of inside gate valve GV-IN (P), there is provided a master cylinder pressure sensor MC/Sen arranged to sense master cylinder pressure Pmc.

(Brake Control)

Hydraulic unit HU is arranged to perform a brake boost control described below at the normal brake operation, and to perform automatic brake such as the vehicle behavior control and the antiskid control.

The vehicle behavior control is a conventional control configured to sense an actual yaw rate of the vehicle by a yaw rate sensor, to determine a target yaw rate by using a steering angle sensor and so on, and to provide a braking force only to a specified wheel so that the actual yaw rate corresponds to the target yaw rate. The antiskid control is a conventional control configured to determine a slip rate and so on from a relationship between a pseudo-vehicle speed and wheel speed, and to control to increase and decrease the wheel cylinder pressure so that the slip rate becomes a desired value.

At the automatic brake control such as the vehicle behavior control, for example, in brake circuit 1P, outside gate valve GV-OUT (P) is closed, and inside gate valve GV-IN (P) is opened. At the same time, pump P is operated so that the hydraulic fluid is supplied from master cylinder M/C through suction circuits 10G and 10H and discharge circuit 10I to brake circuits 10A and 10B.

Moreover, outside gate valve GV-OUT (P) or pressure increasing valve IN/V (FL, RR) is controlled so as to produce a wheel cylinder target hydraulic pressure Pwc* in accordance with the braking force necessary for stabilizing the vehicle behavior. In brake circuit 2S, the same operation is performed.

At the antiskid control, for example, in wheel FL, pressure reducing valve OUT/V (FL) connected with wheel cylinder W/C is opened, and pressure increasing valve IN/V (FL) is closed. The hydraulic fluid in wheel cylinder W/C is discharged to reservoir 16 to decrease the pressure. When wheel FL recovers from a locking tendency, pressure reducing valve OUT/V (FL) is closed to hold the wheel cylinder pressure.

Moreover, pump P starts to be operated, and pressure increasing valve IN/V (FL) is opened to increase the pressure properly. Pump P is arranged to return the hydraulic fluid discharged to reservoir tank 16 at the pressure decreasing operation, to brake circuit 10K.

[Automatic Brake]

(Pressure Increasing Operation)

In the pressure increasing operation by the automatic brake, inside gate valve GV-IN and pressure increasing valve IN/V are opened, and outside gate valve GV-OUT and pressure reducing valve OUT/V are closed. Pump P is actuated (operated) to suck the hydraulic fluid from master cylinder M/C to increase the pressure of wheel cylinders W/C.

(Pressure Reducing Operation)

In the pressure reducing operation by the automatic brake, pressure reducing valve OUT/V is held in the closed state, and outside gate valve GV-OUT and pressure increasing valve IN/V are opened, so that wheel cylinder pressure Pwc is recirculated to master cylinder M/C.

(Pressure Holding Operation)

In the pressure-holding operation, pressure increasing valve IN/V and pressure reducing valve OUT/V are closed. In this state, outside gate valve GV-OUT is controlled based on target wheel cylinder pressure Pwc_at (holding pressure). In a case in which pump P is driven at the automatic brake, the valve opening degree of outside gate valve GV-OUT is increased to decrease the wheel cylinder pressure Pwc when wheel cylinder pressure Pwc increases beyond the holding pressure. On the other hand, when the wheel cylinder pressure Pwc decreases below the holding pressure, the valve opening degree of outside gate valve GV-OUT is decreased to increase the wheel cylinder pressure Pwc by the discharge pressure of pump P.

[Balance Control of Outside Gate Valve]

Figure 2:
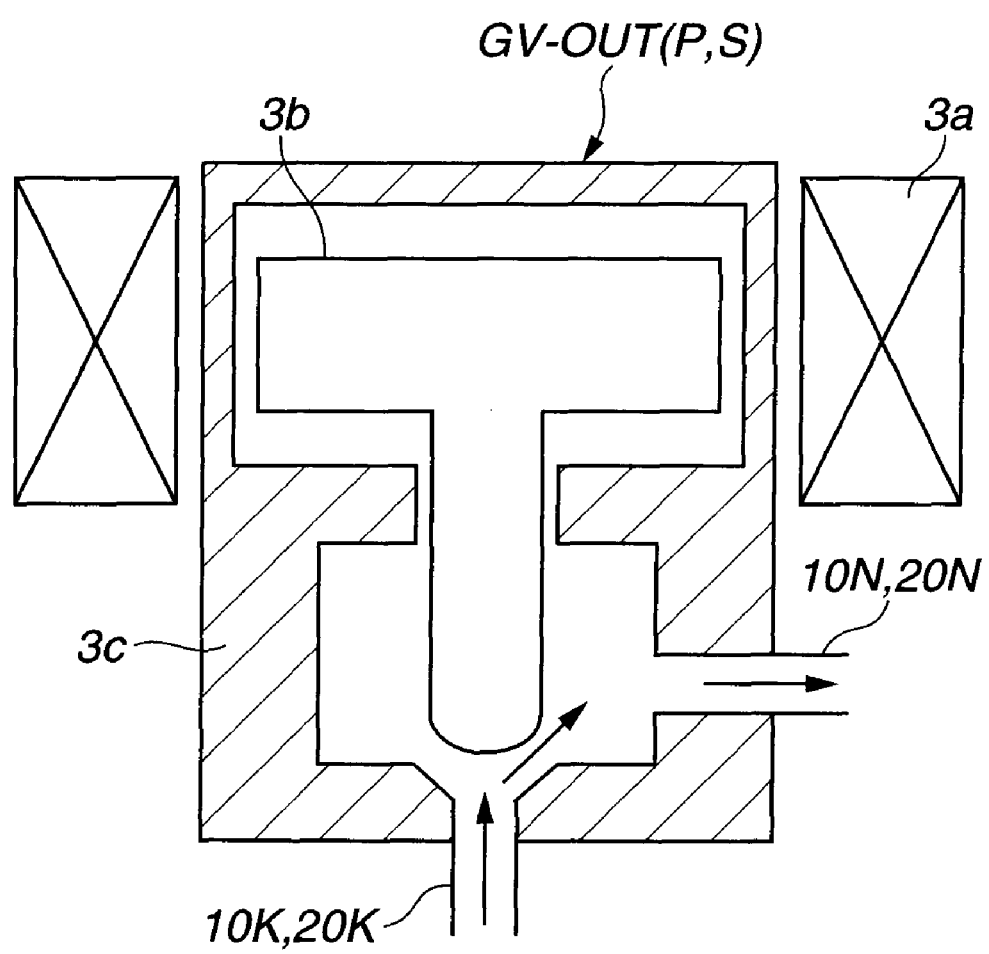
FIG. 2 is a schematic view showing an outside gate valve.

FIG. 2 is a schematic view showing outside gate valve GV-OUT. Outside gate valve GV-OUT includes a coil $3a$ arranged to produce an electromagnetic attraction force; a movable member $3b$ arranged to operate in accordance with the electromagnetic attraction force; and a valve body $3c$ connected with brake circuit 10N or 20N, and brake circuit 10K or 20K.

When movable member $3b$ is moved in the downward direction of FIG. 2, brake circuit 10N, 20N and brake circuit 10K, 20K become a closed state. On the other hand, when movable member $3b$ is moved in the upward direction of FIG. 2, brake circuit 10N, 20N and brake circuit 10K, 20K become an open state. That is, the connection states (pressure difference) of brake circuit 10N, 20N and brake circuit 10K, 20K are determined in accordance with the directions of the movement of movable member $3b$.

Movable member $3b$ receives a force Fwc to push movable member $3b$ in the upward direction of FIG. 2 in accordance with pressure Pwc in the wheel cylinder, a force Fmc to push movable member $3b$ in the downward direction of FIG. 2 in accordance with master cylinder pressure Pmc, and a force Fb to push movable member $3b$ in the downward direction in accordance with the electromagnetic attraction force. Since the outside gate valve GV-OUT is the normally-open valve, the movable member $3b$ receives the force in the valve opening direction by the spring. In this example, this force is not considered. If this force is considered, the offset value is provided.

Movable member $3b$ stops at a position at which these forces are balanced. That is, when Fmc+Fb−Fwc=0 is satisfied, movable member $3b$ stops. When Fmc+Fb−Fwc>0 is satisfied, movable member $3b$ moves in the downward direction. When Fmc+Fb−Fwc<0, movable member $3b$ moves in the upward direction.

Fmc is a value corresponding to master cylinder pressure Pmc. Fwc is a value corresponding to the wheel cylinder pressure Pwc. Accordingly, target pressure difference ΔP is a value corresponding to (Fmc−Fwc).

In a case in which the above-described mathematical expressions are varied, the position of movable member $3b$ is determined by the magnitude relation between (Fmc−Fwc) and Fb. In a case in which electromagnetic attraction force Fb is set identical to target pressure difference ΔP, the position of movable member $3b$ to ensure target pressure difference ΔP is determined.

For example, in a case in which the high pressure is generated on the wheel cylinder side of outside gate valve GV-OUT by using the pump and so on so that wheel cylinder pressure Pwc becomes larger than master cylinder pressure Pmc, the balance control configured to set electromagnetic vacuum force Fb to a value corresponding to the desired pressure difference ΔP is performed. With this, the position of movable member $3b$ is automatically varied in accordance with the pressure increasing operation on the wheel cylinder side. Consequently, it is possible to obtain the target wheel cylinder pressure.

For example, when the discharge pressure of the pump and so on is high, movable member $3b$ is moved in the upward direction so that the wheel cylinder pressure is discharged to the master cylinder side to operate in the pressure reducing direction until the pressure difference becomes automatically the target pressure difference ΔP.

By this balance control, the complicated feedback control is not necessary, and the control error of the motor can be absorbed in the outside gate valve GV-OUT.

That is, after target current value I* corresponding to target pressure difference ΔP is provided in a feed forward manner based on the depression force of the brake pedal by the driver, outside gate valve GV-OUT serves as a mechanical feedback mechanism to attain target pressure difference ΔP. Therefore, it is not necessary to provide sensor and so on arranged to sense the state of the control object, relative to the electrical feedback control mechanism. The control stability is very high.

[Ensuring Pedal Stroke by Opening Inside Gate Valve during Automatic Brake]

At the pressure holding at the automatic brake, pressure increasing valve IN/V is closed to shut off between master cylinder M/C and wheel cylinder W/C. Therefore, brake pedal BP does not perform the stroke.

On the other hand, in the pressure increase at the automatic brake, pressure increasing valve IN/V is opened, and outside gate valve GV-OUT is closed. Accordingly, master cylinder pressure Pmc can not be supplied through outside gate valve GV-OUT to wheel cylinders W/C. Therefore, the quantity of the hydraulic fluid which moves between master cylinder M/C and wheel cylinder W/C are defined by the valve opening degree of the opened inside gate valve GV-IN.

In the pressure increase at the automatic brake, inside gate valve GV-IN is opened, and pump P is driven so that the hydraulic fluid is sucked from master cylinder M/C to increase the pressure in wheel cylinder W/C. Therefore, the valve opening degree of inside gate valve GV-IN is defined by a command wheel cylinder pressure Pwc_ato in the automatic-brake pressure-increasing control.

Inside gate valve GV-IN is defined (controlled) to the valve opening degree in the automatic-brake pressure-increasing control. Accordingly, it is not possible to supply master cylinder pressure Pmc to wheel cylinder W/C beyond the valve opening degree. Therefore, when the vehicle becomes the brake override state in which the brake pedal is depressed during the automatic brake control, the vehicle becomes the stiff brake pedal state in which the pedal stroke is not caused even when the brake pedal BP is depressed.

Accordingly, in the present invention, when the brake pedal BP is depressed during the automatic brake pressure increasing control, the valve opening degree of inside gate valve GV-IN is increased. The valve is opened by the valve opening degree greater than the command valve opening degree of the automatic-brake pressure-increasing control. Therefore, pump P sucks, from master cylinder M/C, the hydraulic fluid equal to or greater than the quantity necessary for the automatic-brake pressure-increasing control.

Therefore, in case of the brake override state, pump P sucks the increasing quantity of master cylinder pressure Pmc by the depression of brake pedal BP during the automatic-brake pressure-increasing control, so as to ensure the pedal stroke S. In this case, a stroke-ensuring increasing quantity ΔPwc is added to command wheel cylinder pressure Pwc of the automatic-brake pressure-increasing control to set target wheel cylinder pressure Pwc_at. The rotational speed of pump P is increased to a value corresponding to the hydraulic fluid sucked from master cylinder M/C.

Similarly, in the pressure reduction or the pressure holding, the valve opening degree of inside gate valve GV-IN is controlled, and pump P sucks master cylinder pressure Pmc so as to ensure pedal stroke S. Stroke-ensuring increasing quantity ΔPwc is added since pump P sucks master cylinder pressure Pmc.

Accordingly, there is no need for another component such as a stroke simulator. Pedal stroke S is ensured by using the original hydraulic circuit.

[Setting of ΔPwc]

Figure 3:
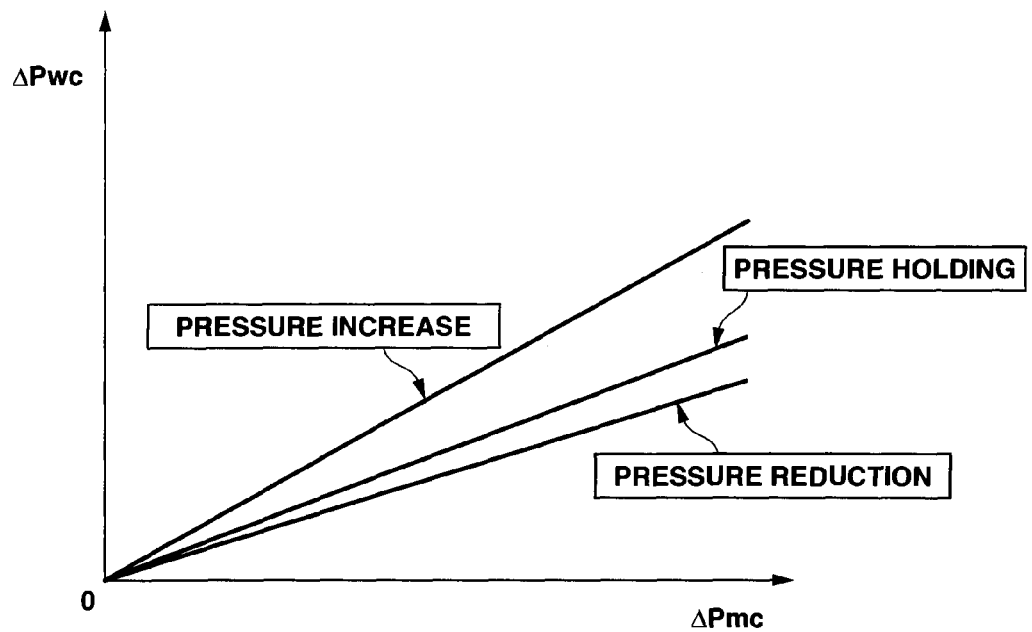
FIG. 3 is a map showing a relationship between a stroke-ensuring increasing quantity and a master cylinder pressure variation.

FIG. 3 is a map showing a relationship between stroke-ensuring increasing quantity ΔPwc and master cylinder pressure variation ΔPmc. The stroke-ensuring increasing quantity ΔPwc is switched between the pressure increase, the pressure holding, and the pressure reduction by the automatic brake. The suction quantity of the hydraulic fluid within master cylinder M/C by pump P is varied so as to obtain the appropriate pedal feeling.

This ΔPmc is a variation of master cylinder pressure Pmc. This ΔPmc is dependent on the stroke speed. Accordingly, the stroke-ensuring increasing quantity ΔPwc is increased as the stroke speed is increased, so that the suction quantity of the hydraulic fluid from master cylinder M/C is increased.

In the pressure increase, the gradient of stroke-ensuring increasing quantity ΔPwc with respect to master cylinder pressure variation ΔPmc is set larger than that in the pressure holding and the pressure reduction. With this, the suction quantity of the hydraulic fluid from master cylinder M/C is increased, so that the brake stroke operation is facilitated.

Figure 4:
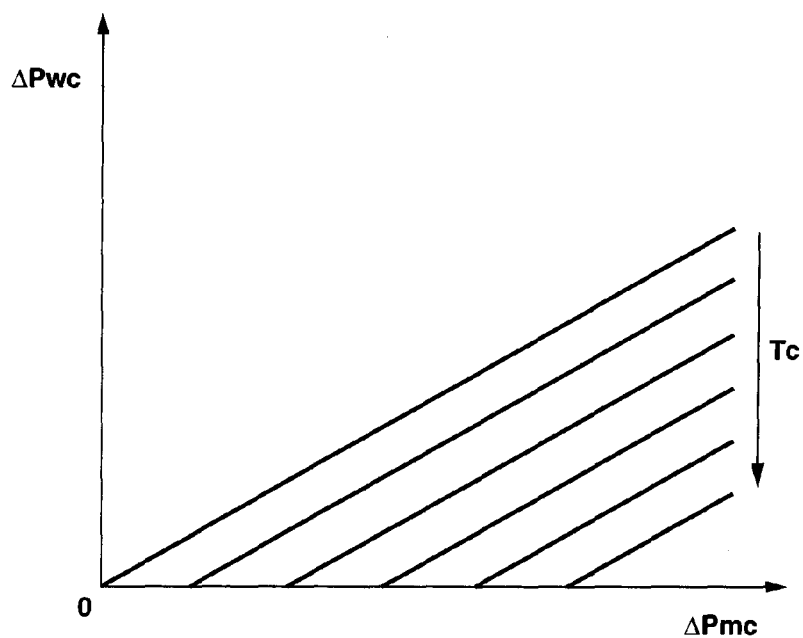
FIG. 4 is a graph showing a relationship between ΔPwc and ΔPmc during an automatic brake pressure increasing control.

As shown in FIG. 4, the graph of ΔPwc and ΔPmc may be moved in parallel. FIG. 4 is a graph showing a relationship between ΔPwc and ΔPmc in the automatic brake pressure increase.

$$\Delta Pwc = K\alpha \times \Delta Pmc - K\beta \times Tc$$

where α, β, K are constant values, and Tc is a time period from start of the operation of brake pedal BP. An intercept is decreased as time period Tc elapses from the start of the pedal operation, and the graph is moved in parallel in the downward direction. Time period Tc is measured by a counter (operation time period sensing section) within control unit CU.

As time period Tc elapses from the start of the pedal operation, stroke-ensuring increasing quantity ΔPwc with respect to the same master cylinder pressure variation ΔPmc is decreased. Accordingly, it is difficult to perform the stroke of brake pedal BP as time period Tc elapses from the start of the pedal operation. Moreover, it is possible to increase the stroke quantity of the brake pedal BP suddenly after the pedal operation.

Accordingly, the stroke quantity is decreased as the time elapses from the start of the operation, so as to attain the good pedal feeling. FIG. 4 is a graph only during the automatic brake pressure increase. In the pressure holding and the pressure reduction, it is optional that the graph is moved in parallel in the downward direction to attain the good pedal feeling. In FIG. 4, the graph is moved in parallel as the time elapses, under the assumption that pedal stroke S is increased as the time elapses. However, it is optional that the graph is moved in parallel directly in accordance with the increase of pedal stroke S.

The increase of wheel cylinder pressure Pwc in the pressure increase is dependent on the suction quantity of the hydraulic fluid from master cylinder M/C. Therefore, in the pressure increase of stroke-ensuring increasing quantity ΔPwc, the driving quantity of pump P or the valve opening degree of inside gate valve GN-IN is controlled, so that the hydraulic fluid quantity from master cylinder M/C to wheel cylinder W/C is controlled. In this way, the pressure increasing operation of stroke-ensuring increasing quantity ΔPwc is performed (FIG. 5: step S107).

[Automatic Brake Control Flow]

Figure 5:
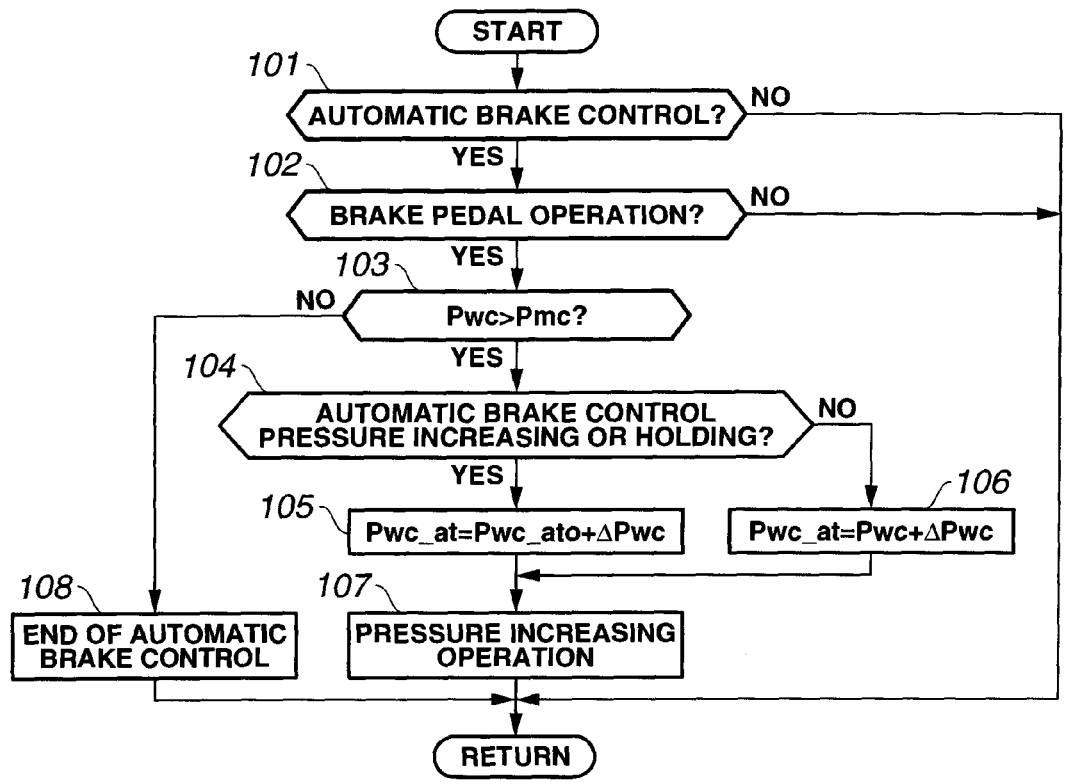
FIG. 5 is a flowchart showing an automatic brake control process.

FIG. 5 is a flowchart showing an automatic brake control process.

At step S101, the controller is configured to judge whether or not the automatic brake control is performed. When the answer of step S101 is affirmative (YES), the process proceeds to step S102. When the answer of step S101 is negative (NO), the control process is finished.

At step S102, the controller is configured to judge whether or not the brake pedal BP is operated or depressed. When the answer of step S102 is YES, the process proceeds to step S103. When the answer of step S102 is NO, the control process is finished.

At step S103, the controller is configured to judge whether or not wheel cylinder pressure Pwc is greater than master cylinder pressure Pmc (wheel cylinder pressure Pwc>master cylinder pressure Pmc). When the answer of step S103 is YES, the process proceeds to step S104. When the answer of step S103 is NO, the process proceeds to step S108.

At step S104, the controller is configured to judge whether or not the pressure is increased or held by the automatic brake control. When the answer of step S104 is YES, the process proceeds to step S105. When the answer of step S104 is NO, the process proceeds to step S106.

Subsequently to the affirmative answer at step S104 (the depression of brake pedal BP during the pressure increase by the automatic brake control (FIG. 4)), at step S105, the controller is configured to calculate the target wheel cylinder pressure Pwc_at by adding stroke-ensuring increasing quantity ΔPwc of brake pedal BP to command wheel cylinder pressure Pwc_ato of the automatic brake control. Subsequently to step S105, the process proceeds to step S107. In the pressure holding operation, at step S105, the controller is also configured to calculate the target wheel cylinder pressure Pwc_at by adding stroke-ensuring increasing quantity ΔPwc of brake pedal BP to command wheel cylinder pressure Pwc_ato of the automatic brake control (target wheel cylinder pressure Pwc_at=automatic brake command wheel cylinder pressure Pwc_ato+stroke-ensuring increasing quantity ΔPwc), like in the pressure increasing operation. Accordingly, target wheel cylinder pressure Pwc_at monotonically increases, and the stroke is ensured.

Subsequently to the negative answer at step S104 (the depression of brake pedal BP during the pressure reduction by the automatic brake control), at step S106, the controller is configured to calculate target wheel cylinder pressure Pwc_at by adding stroke-ensuring increasing quantity ΔPwc of brake pedal BP to a wheel cylinder pressure current value Pwc. Subsequently to step S106, the process proceeds to step S107. In the pressure increasing operation and the pressure holding operation, the controller adds stroke-ensuring increasing quantity ΔPwc to command wheel cylinder pressure Pwc_ato. However, in the pressure decreasing operation, the controller adds stroke-ensuring increasing quantity ΔPwc to wheel cylinder pressure current value Pwc.

In the pressure reducing operation, automatic brake command wheel cylinder pressure Pwc_ato decreases. Accordingly, the decreasing quantity of command wheel cylinder pressure Pwc_ato is not compensated even when the stroke-ensuring increasing quantity ΔPwc is added. Therefore, target wheel cylinder pressure Pwc_at (=command wheel cylinder pressure Pwc_ato+stroke-ensuring increasing quantity ΔPwc) monotonically decreases. Accordingly, pump P may not suck the hydraulic fluid from master cylinder M/C, and the stroke of brake pedal BP may not be caused.

Accordingly, in the pressure reduction, the controller is configured to calculate target wheel cylinder pressure Pwc_at by adding stroke-ensuring increasing quantity ΔPwc to wheel cylinder pressure current value Pwc (target wheel cylinder pressure Pwc_at=wheel cylinder pressure current value Pwc+ stroke-ensuring increasing quantity ΔPwc). Therefore, target wheel cylinder pressure Pwc_at monotonically increases to ensure pedal stroke S.

At step S107, the controller is configured to supply the hydraulic fluid of stroke-ensuring increasing quantity ΔPwc to wheel cylinder W/C by opening inside gate valve GV-IN, and to perform a stroke ensuring control or stroke-ensuring pressure-increasing control to attain target wheel cylinder pressure Pwc_at. In this case, one of the following methods is selected to increase wheel cylinder pressure Pwc to ensure the pressure increasing quantity of stroke-ensuring increasing quantity ΔPwc:

(a) to hold the rotational speed of motor M constant, to use inside gate valve GV-IN as an ON/OFF valve, and to control time period of the valve opening of inside gate valve GV-IN (FIG. 9),
(b) to hold the rotational speed of motor M constant, to use inside gate valve GV-IN as a proportional valve, and to control the valve opening degree of inside gate valve GV-IN (FIG. 10), and
(c) to control the rotational speed of motor M, and to hold inside gate valve GV-IN in the open state (FIG. 11). Moreover, the above-mentioned methods may be arbitrarily combined.

At step S108, the controller is configured to finish the automatic brake control, and the control process is finished.

[Depression of Brake Pedal during Automatic Brake Control]

Figure 6:
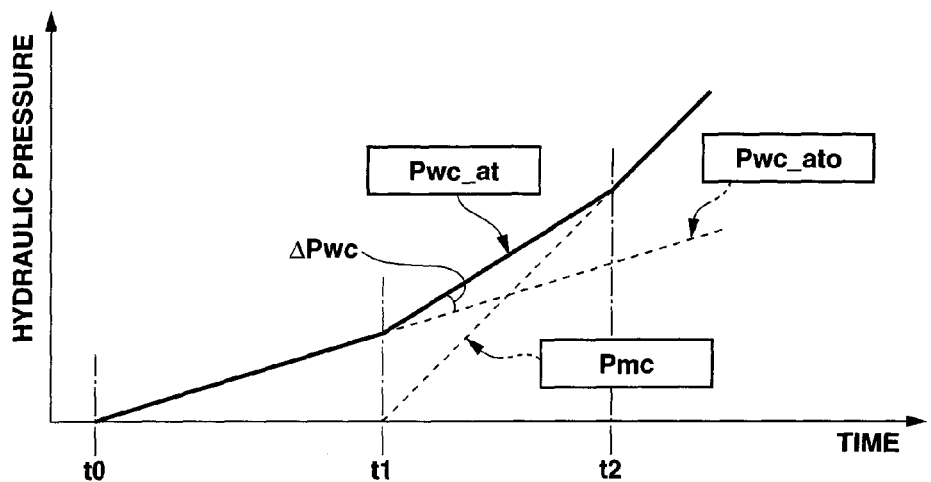
FIG. 6 is a time chart of a hydraulic pressure when a pedal is depressed during the automatic brake pressure-increasing control.
Figure 7:
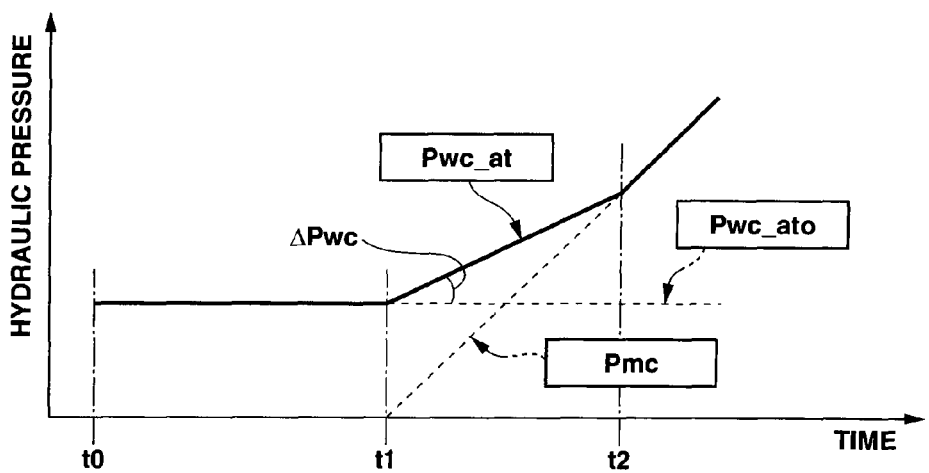
FIG. 7 is a time chart of the hydraulic pressure when the pedal is depressed during the automatic brake pressure-holding control.
Figure 8:
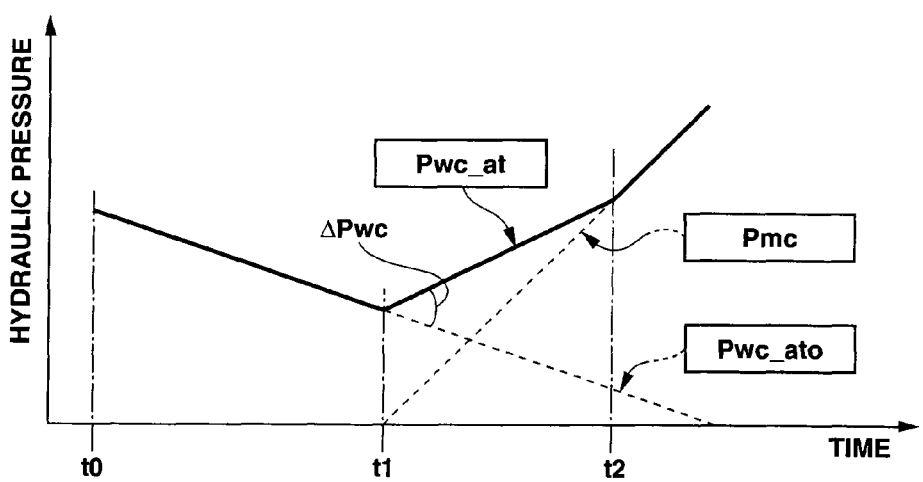
FIG. 8 is a time chart of the hydraulic pressure when the pedal is depressed during the automatic brake pressure-decreasing control.

FIGS. 6-8 show time charts of the hydraulic pressure when brake pedal BP is depressed during the automatic brake control.

[FIG. 6: Depression during Pressure Increase]

FIG. 6 is a time chart when brake pedal BP is depressed during the pressure increasing operation of the automatic brake control.

(Automatic Brake Pressure-Increasing Control Region (t0-t1))

The controller is configured to set command wheel cylinder pressure Pwc_ato of the automatic-brake pressure-increasing control, directly to target wheel cylinder pressure Pwc_at.

(Automatic Brake Pressure-Increasing Control+Brake Pedal Operation Region (t1-t2))

The controller is configured to calculate target wheel cylinder pressure Pwc_at by adding stroke-ensuring increasing quantity ΔPwc which is by the operation of brake pedal BP, to command wheel cylinder pressure Pwc_ato in the automatic brake control pressure-increase.

(Automatic Brake End Region (t2-))

The controller is configured to set wheel cylinder pressure Pwc=master cylinder pressure Pmc which is by the operation of brake pedal BP, directly to target wheel cylinder pressure Pwc_at.

[FIG. 7: Depression during Pressure Holding]

FIG. 7 is a time chart when brake pedal BP is depressed during the pressure holding of the automatic brake control.

(Automatic Brake Pressure-Holding Control Region (t0-t1))

The controller is set holding pressure Pwc_ato of the automatic brake control directly to target wheel cylinder pressure Pwc_at.

(Automatic Brake Pressure-Holding Control+Brake Pedal Operation Region (t1-t2))

The controller is configured to calculate target wheel cylinder pressure Pwc_at by adding stroke-ensuring increasing quantity ΔPwc (cf. FIG. 3) in the pressure-holding operation to wheel cylinder pressure current value Pwc (=automatic brake control holding pressure Pwc_ato) at the depression of the brake pedal.

(Automatic Brake End Region (t2-))

Like the pressure increasing operation of the automatic brake, the controller is configured to set wheel cylinder pressure Pwc=master cylinder pressure Pmc which is by the operation of brake pedal BP, directly to target wheel cylinder pressure Pwc_at.

[FIG. 8: Depression During Pressure Reduction]

FIG. 8 is a time chart when brake pedal BP is depressed during the pressure reduction of the automatic brake control.

(Automatic Brake Pressure-Reducing Control Region (t0-t1))

The controller is configured to set command wheel cylinder pressure Pwc_ato, directly to target wheel cylinder pressure Pwc_at.

(Automatic Brake Pressure-Reducing Control+Brake Pedal Operation Region (t1-t2))

The controller is configured to calculate target wheel cylinder pressure Pwc_at by adding stroke-ensuring increasing quantity ΔPwc (cf. FIG. 3) to wheel cylinder pressure current value Pwc at the depression of the brake pedal. As mentioned above, increasing quantity ΔPwc is added to current value Pwc. With this, target wheel cylinder pressure Pwc monotonically increases, and pedal stroke S is ensured.

(Automatic Brake End Region (t2-))

Like the pressure increase and the pressure holding of the automatic brake, the controller is configured to set wheel cylinder pressure Pwc=master cylinder pressure Pmc which is by the operation of brake pedal BP, directly to target wheel cylinder pressure Pwc_at.

[Variation with Time of Stroke Ensuring Control in Automatic Brake Pressure Holding]

FIGS. 9-11 are time charts of the stroke ensuring control performed at step S107 of FIG. 5. FIGS. 9-11 show the stroke ensuring control in the automatic brake pressure-holding. Outside gate valve GV-OUT is in the closed state by the balance control (cf. FIG. 2) during the automatic brake control.

As mentioned above, the stroke ensuring control has three control methods (a), (b) and (c) (cf. step S107). FIGS. 9, 10 and 11 correspond, respectively, to (a), (b) and (c).

[FIG. 9: (a) Control of Valve Opening Time Period of Inside Gate Valve (ON/OFF valve)]

FIG. 9 is a time chart when inside gate valve GV-IN is used as the ON/OFF valve, and the valve opening time period is controlled.

(Time t0)

At time t0, the automatic brake pressure-holding control is performed.

(Time t1)

At time t1, the depression of brake pedal BP starts. It becomes the brake override state. With this, stroke-ensuring increasing quantity ΔPwc is added to command wheel cylinder holding pressure Pwc_ato. In this case, the controller controls the time period during which inside gate valve GV-IN is in the valve opening state, so as to control the suction quantity of the hydraulic fluid from master cylinder M/C. Consequently, pump P supplies the hydraulic fluid of stroke-ensuring increasing quantity ΔPwc to wheel cylinder W/C.

(Time t2)

At time t2, the automatic brake control is finished. Motor M is stopped. Inside gate valve GV-IN is closed. Consequently, the process proceeds to the normal control by the master cylinder pressure Pmc. Outside gate valve GV-OUT is opened.

[FIG. 10: (b) Control of Valve Opening Degree of Inside Gate Valve (Proportional Valve)]

FIG. 10 is a time chart when inside gate valve GV-IN is used as a proportional valve, and the valve opening degree is controlled.

(Time t0)

At time t0, the automatic brake pressure-holding control is performed, like FIG. 9.

(Time t1)

At time t1, the depression of brake pedal BP starts. It becomes the brake override state. Stroke-ensuring increasing quantity ΔPwc is added to command wheel cylinder holding pressure Pwc_ato. In this case, the valve opening degree of inside gate valve GV-IN is controlled, so that the valve opening degree is decreased with elapsed time period Tc from pedal stroke start time t1. With this, the hydraulic fluid quantity that pump P supplies from master cylinder M/C to wheel cylinder W/C is controlled.

(Time t2)

At time t2, the automatic brake control is finished, like FIG. 9. The process proceeds to the normal control. The outside gate valve GV-OUT is opened.

[FIG. 11: (c) Control of Motor Rotational Speed]

FIG. 11 is a time chart when the rotational speed of motor M is controlled.

(Time t0)

At time t0, the automatic brake pressure-holding control is performed, like FIG. 9.

(Time t1)

At time t1, the depression of brake pedal BP starts. It becomes the brake override state. Stroke-ensuring increasing quantity ΔPwc is added to command wheel cylinder holding pressure Pwc_ato. In this case, the rotational speed of motor M is controlled, so that the rotational speed is decreased as time period Tc elapses from pedal stroke start time t1. With this, the quantity of the hydraulic fluid that pump P supplies from master cylinder M/C to wheel cylinder W/C is controlled.

Effect of First Embodiment

The brake control apparatus according to the present invention includes a master cylinder (M/C); a wheel cylinder (W/C); a hydraulic pressure source (pump) (P) arranged to supply a hydraulic fluid sucked from the master cylinder M/C to the wheel cylinder (W/C), and to increase a pressure (Pwc) of the wheel cylinder (W/C); a control valve (pressure increasing valve and a pressure reducing valve) (IN/V, OUT/V) arranged to increase or reduce the pressure Pwc of the wheel cylinder (W/C); an outside gate valve GV-OUT arranged to connect or disconnect between the master cylinder (M/C) and the wheel cylinder (W/C); a brake operation sensing section (brake switch) (18) configured to sense a driver's brake operation; and a control unit (CU) configured to control the hydraulic pressure source (P), the control valve (IN/V, OUT/V), and the outside gate valve (GV-OUT), to perform an automatic-brake pressure-increasing control to control the outside gate valve (GV-OUT) in a valve closing direction, to drive the hydraulic pressure source (P), and thereby to increase the pressure of the wheel cylinder (W/C) in accordance with a vehicle condition, and to increase a driving quantity of the hydraulic pressure source (P) when the brake operation is sensed during the automatic-brake pressure-increasing control.

Accordingly, even when brake pedal BP is depressed during the automatic brake pressure-increasing control (brake override state), it is possible to ensure pedal stroke S by using the original hydraulic circuit, without providing another stroke simulator and so on.

In the brake control apparatus according to the present invention, the control unit (CU) is configured to perform an automatic brake pressure-holding control to control the outside gate valve (GV-OUT) in the valve closing direction, to stop the hydraulic pressure source (P), and to hold the pressure (Pwc) of the wheel cylinder (W/C); and the control unit (CU) is configured to drive the hydraulic pressure source (P) when the brake operation is sensed during the automatic brake pressure-holding control, and to suck the hydraulic fluid from the master cylinder (M/C).

Accordingly, even in the brake override state during the automatic brake pressure-holding control, it is also possible to ensure pedal stroke S by using the original hydraulic circuit, without providing another stroke simulator and so on.

In the brake control apparatus according to the present invention, the control unit (CU) is configured to perform an automatic brake pressure-reducing control to control the outside gate valve (GV-OUT) in a valve opening direction, to stop the hydraulic pressure source (P), and to reduce the pressure (Pwc) of the wheel cylinder (W/C); and the control unit (CU) is configured to drive the hydraulic pressure source (P) when the brake operation is sensed during the automatic brake pressure-reducing control, and to suck the hydraulic fluid from the master cylinder (M/C).

Accordingly, even in the brake override state during the automatic brake pressure-reducing control, it is also possible to ensure pedal stroke S by using the original hydraulic circuit, without providing another stroke simulator and so on.

The brake control apparatus includes an inside gate valve (GV-IN) provided between the master cylinder (M/C) and a suction portion of the hydraulic pressure source (P). The control unit (CU) is configured to perform an automatic-brake pressure-increasing control to open the inside gate valve (GV-IN) by a predetermined valve opening degree, to control a valve opening degree of the outside gate valve (GV-OUT), to drive the hydraulic pressure source (P), and thereby to increase the pressure (Pwc) of the wheel cylinder (W/C) in accordance with a vehicle condition, and to increase the valve opening degree of the inside gate valve (GV-IN) or a driving quantity of the hydraulic pressure source (P) when the brake operation is sensed during the automatic-brake pressure-increasing control.

The controller controls the valve opening degree of inside gate valve GV-IN during the automatic brake pressure-increasing control. Accordingly, it is also possible to ensure pedal stroke S by using the original hydraulic circuit, without providing another stroke simulator and so on.

In the brake control apparatus according to the present invention, the control unit (CU) is configured to increase the driving quantity of the hydraulic pressure source (P).

In the brake control apparatus according to the present invention, the control unit (CU) is configured to decrease the driving quantity of the hydraulic pressure source (P) with an elapsed time period (Tc) from the detection of the brake operation when the brake operation is sensed.

The controller controls the rotational speed of motor M so that the rotational speed is decreased with elapsed time period Tc from pedal stroke start time t1. Consequently, the hydraulic fluid quantity that pump P supplies from master cylinder M/C to wheel cylinder W/C is controlled. Accordingly, it is possible to decrease the stroke quantity as the time elapses from the pedal operation start, and to obtain the good pedal operation feeling.

In the brake control apparatus according to the present invention, the control unit (CU) is configured to decrease the valve opening degree of the inside gate valve (GV-IN) with an elapsed time period (Tc) from the detection of the brake operation when the brake operation is sensed.

Accordingly, it is possible to decrease the stroke quantity as the time elapses from the pedal operation start, and to obtain the good pedal operation feeling, by the control of the valve opening degree of inside gate valve GV-IN.

In the brake control apparatus according to the present invention, the control unit (CU) is configured to perform an automatic-brake pressure-holding control to close the inside gate valve (GV-IN) and the outside gate valve (GV-OUT), to stop the hydraulic pressure source (P), and to hold the pressure (Pwc) of the wheel cylinder (W/C) in accordance with a vehicle condition, and to open the inside gate valve (GV-IN), to drive the hydraulic pressure source (P), and thereby to suck the hydraulic fluid in the master cylinder (M/C) when the brake operation is sensed during the automatic-brake pressure-holding control.

Accordingly, it is also possible to ensure pedal stroke S by using the original hydraulic circuit, by controlling the valve opening degree of inside gate valve GV-IN even during the automatic brake pressure-holding control.

In the brake control apparatus according to the present invention, the control unit (CU) is configured to increase the pressure (Pwc) of the wheel cylinder (W/C) by the hydraulic fluid sucked from the master cylinder (M/C). Accordingly, it is possible to ensure the pedal stroke, and to increase the brake force by the driver's intension.

In the brake control apparatus according to the present invention, the brake control apparatus further includes a brake pedal (BP), and a pedal operation quantity sensing section (stroke sensor) (S/Sen) configured to sense an operation quantity (stroke S) of the brake pedal (BP); and the control unit (CU) is configured to calculate an increasing quantity of the pressure of the wheel cylinder (W/C) based on the sensed operation quantity of the brake pedal (BP).

Accordingly, it is possible to set target wheel cylinder pressure Pwc_at based on the depression quantity of brake pedal BP, and to obtain the braking force corresponding to the intention of the driver.

In the brake control apparatus according to the present invention, the brake control apparatus further includes a brake pedal (BP), and an operation time period sensing section (CU) configured to measure an operation time period from a start of the operation of the brake pedal (BP); and the control unit (CU) is configured to decrease the driving quantity of the hydraulic pressure source (P) with the operation time period (Tc) sensed by the operation time period sensing section (CU).

Accordingly, it is possible to decrease the stroke quantity as the time elapses from the pedal operation start, and to obtain the good pedal operation feeling, by controlling the driving quantity of pump P.

In the brake control apparatus according to the present invention, the control unit (CU) is configured to decrease the driving quantity of the hydraulic pressure source (P) with an elapsed time period when the brake operation is sensed.

Accordingly, it is possible to decrease the pedal stroke quantity as the time elapses, and to obtain the good pedal operation feeling.

In the brake control apparatus according to the present invention, the control unit (CU) is configured to decrease the valve opening degree of the inside gate valve (GV-IN) with an elapsed time period (Tc) when the brake operation is sensed.

Accordingly, it is possible to decrease the pedal stroke quantity as the time elapses, and to obtain the good pedal operation feeling, by controlling the valve opening degree of inside gate valve GV-IN.

In the brake control apparatus according to the present invention, the control unit (CU) configured to perform an automatic-brake pressure-reducing control to open the outside gate valve (GV-OUT), to stop the hydraulic pressure source (P), and thereby to reduce the pressure of the wheel cylinder in accordance with a vehicle condition, and to open the inside gate valve (GV-IN), to drive the hydraulic pressure source (P), and thereby to suck the hydraulic fluid in the master cylinder (M/C) when the brake operation is sensed during the automatic-brake pressure-reducing control.

Accordingly, it is possible to ensure pedal stroke S by using the original hydraulic circuit in the brake override state, by controlling the valve opening degree of inside gate valve GV-IN and the driving quantity of pump P even during the automatic brake pressure-reducing control.

The brake control method according to the present invention includes: performing an automatic brake control including a pressure increasing control to suck a hydraulic fluid from a master cylinder at least by a hydraulic pressure source, and to increase a pressure of a wheel cylinder by the hydraulic fluid from the master cylinder in accordance with a vehicle condition, a pressure holding control to hold the increased pressure of the wheel cylinder, and a pressure reducing control to reduce the pressure of the wheel cylinder; sensing a driver's further depression during the automatic brake control; and flowing the hydraulic fluid in the master cylinder to the wheel cylinder when the further depression is sensed during the automatic brake control.

Accordingly, even when brake pedal BP is depressed during the automatic brake pressure-increasing control (brake override state), it is possible to ensure pedal stroke S by using the original hydraulic circuit, without providing another stroke simulator and so on.

In the brake control apparatus according to the present invention, the control unit (CU) is configured to flow the hydraulic fluid in the master cylinder (M/C) to the wheel cylinder (W/C) by the hydraulic pressure source (P). Accordingly, it is possible to ensure the pedal stroke, and to increase the brake force by the driver's intension.

Second Embodiment

Hereinafter, a second embodiment is illustrated. The basic structure of the second embodiment is identical to the structure of the first embodiment. In the first embodiment, outside gate valve GV-OUT is controlled to the fully open state or the fully closed state during the automatic brake control. In this second embodiment, outside gate valve GV-OUT is controlled in the valve opening direction by the balance control (cf. FIG. 2) at the depression of brake pedal BP even during the automatic brake, unlike the first embodiment.

[Control of Wheel Cylinder Pressure by Outside Gate Valve]

In the hydraulic circuit according to the present invention, outside gate valve GV-OUT and pressure increasing valve IN/V are opened during the automatic brake control, and accordingly wheel cylinder pressure Pwc is returned to master cylinder M/C so as to decrease the pressure. Accordingly, outside gate valve GV-OUT is opened during the pressure increase performed by pump P, and it is possible to decrease the speed of the pressure increase of wheel cylinder W/C.

Moreover, the above-mentioned balance control (FIG. 2) is performed, so that the circulating circuit (circulation circuit) is formed by gate valves GV-IN and GV-OUT and pump P so as to circulate the hydraulic fluid. Accordingly, it is possible to hold wheel cylinder pressure Pwc in a state in which pump P is driven.

Moreover, outside gate valve GV-OUT and pressure increasing valve IN/V are opened during the pressure reduction performed by using pressure reducing valve OUT/V. The hydraulic fluid is discharged to reservoir 16 and 26 and also master cylinder M/C. Accordingly, it is possible to increase the speed of the pressure reduction, relative to a case in which the pressure reduction is performed only by pressure reducing valve OUT/V.

The control to ensure pedal stroke S at the depression of brake pedal BP while the wheel cylinder pressure control is performed by opening outside gate valve GV-OUT during the automatic brake control is illustrated below.

[Variation with Time of Stroke Ensuring Control in Second Embodiment]

FIG. 12 is a time chart of the stroke ensuring control according to the second embodiment. Like the first embodiment, FIG. 12 shows a time chart during the automatic brake pressure-holding control. Besides, the above-mentioned balance control (FIG. 2) is performed in outside gate valve GV-OUT in a case in which brake pedal BP is not depressed (before t1).

(Time t0)

At time t0, outside gate valve GV-OUT is controlled by the balance control. Wheel cylinder W/C is held to the constant holding pressure. Inside gate valve GV-IN is opened. When pump P sucks the hydraulic fluid from master cylinder M/C so as to increase the pressure on wheel cylinder W/C side of outside gate valve GV-OUT, the valve opening degree of outside gate valve GV-OUT is increased by the balance control. The residual hydraulic fluid is returned to master cylinder M/C to hold the holding pressure. Accordingly, wheel cylinder pressure Pwc is held while pump P is driven.

(Time t1)

At time t1, the depression of brake pedal BP starts, and it becomes the brake override state. With this, stroke-ensuring increasing quantity ΔPwc is added to command wheel cylinder holding pressure Pwc_ato. In this case, the energization quantity of outside gate valve GV-OUT is decreased so as to increase the valve opening degree. Accordingly, the hydraulic fluid quantity returned to master cylinder M/C is increased. The hydraulic fluid which is not returned to master cylinder M/C, of the hydraulic fluid discharged from master cylinder M/C by the stroke of brake pedal BP is supplied to wheel cylinder W/C to increase wheel cylinder pressure Pwc. The valve opening degree of outside gate valve GV-OUT is controlled so as to satisfy the increasing quantity of wheel cylinder pressure=stroke-ensuring increasing quantity ΔPwc. Like the first embodiment, pedal stroke S during the automatic control is ensured by the hydraulic fluid returned to master cylinder M/C, and the hydraulic fluid of the increasing quantity of wheel cylinder W/C.

(Time t2)

At time t2, the automatic brake control is finished. Motor M is stopped. Inside gate valve GV-IN is opened. Consequently, the process proceeds to the normal holding control.

Effect of Second Embodiment

Outside gate valve GV-OUT is controlled in the valve opening direction in a case in which brake pedal BP is depressed even when the balance control is performed during the automatic brake. Accordingly, it is possible to ensure stroke S, like the first embodiment.

Third Embodiment

A third embodiment is illustrated below. In the first embodiment, the stroke-ensuring control is performed during the automatic brake pressure-holding control. In this third embodiment, the stroke-ensuring control is performed during the automatic brake pressure-increasing control.

[Depression of Brake Pedal during Automatic Brake Pressure-Increasing Control]

Figure 15:
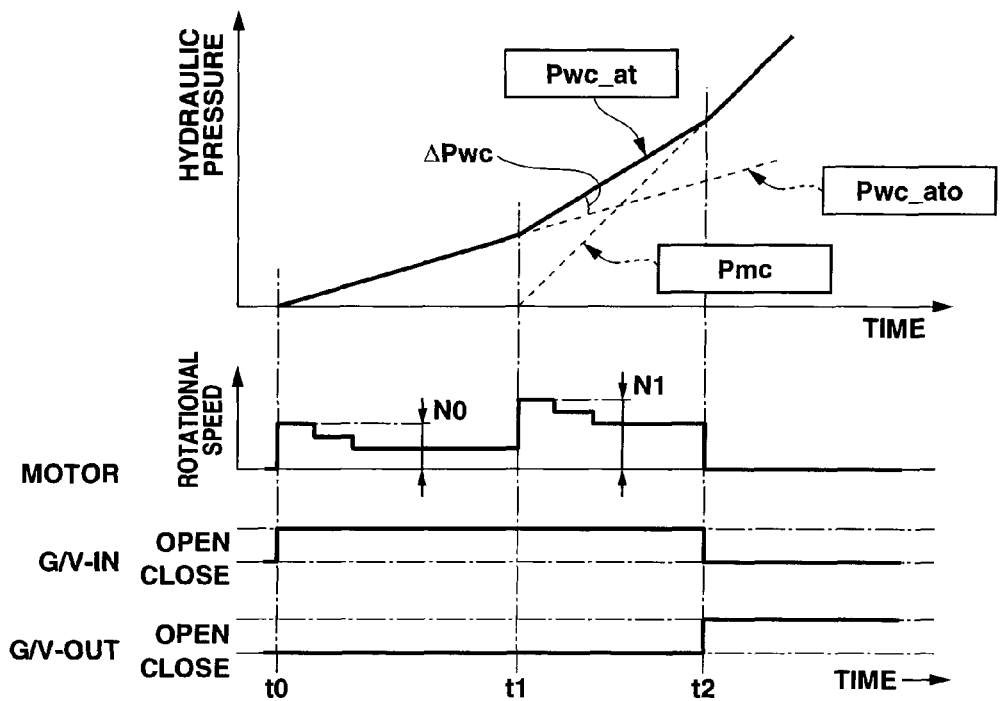
FIG. 15 is a time chart of the stroke ensuring control during the pressure increase by the automatic brake control (control of the rotational speed of the motor).
Figure 16:
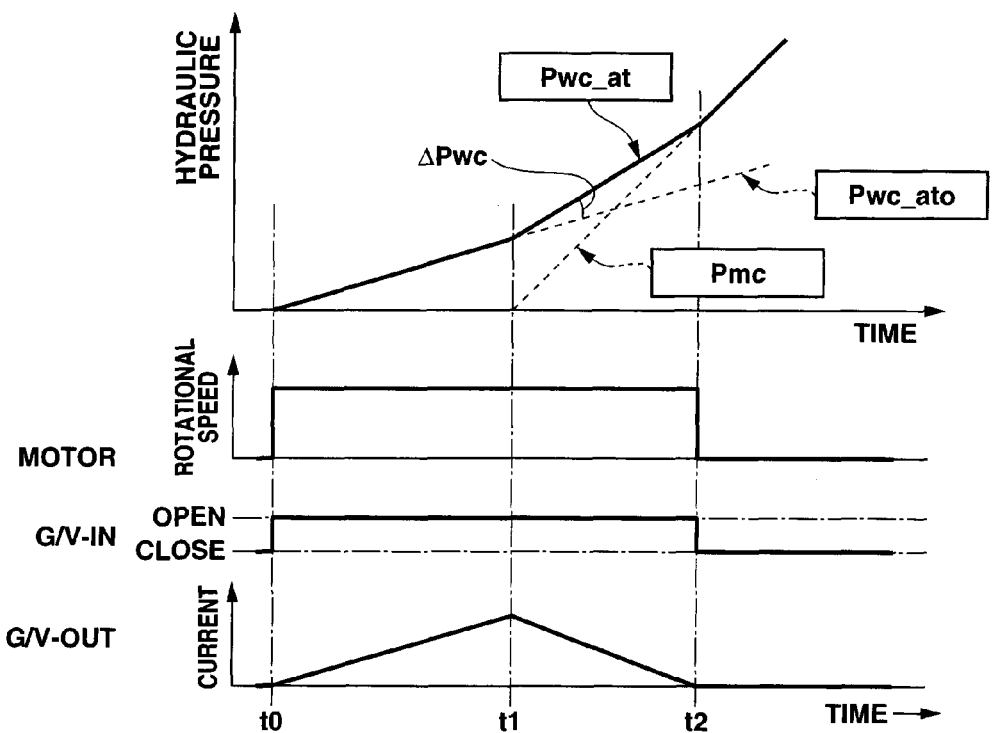
FIG. 16 is a time chart of the stroke ensuring control during the pressure increase by the automatic brake control (control of the outside gate valve).

FIGS. 13-16 are time charts when brake pedal BP is depressed during the automatic brake pressure-increasing control. FIG. 13 is a time chart when the rotational speed of motor M is constant, inside gate valve GV-IN is used as the ON/OFF valve, and the valve opening time period is controlled (cf. (a)). FIG. 14 is a time chart when the rotational speed of motor M is constant, inside gate valve GV-IN is used as the proportional valve, and the valve opening degree is controlled (cf. (b)). FIG. 15 is a time chart when the rotational speed of motor M is controlled, and inside gate valve GV-IN is held in the open state (cf. (c)). FIG. 16 is a time chart when outside gate valve GV-OUT is controlled in the valve opening direction like the second embodiment.

[FIG. 13: (a) Control of Valve Opening Time Period of Inside Gate Valve (ON/OFF Valve)]

(Time t0)

At time t0, the automatic brake pressure-increasing control starts, and inside gate valve GV-IN is opened. The valve opening time period is T0 in one control cycle. Pump P supplies the hydraulic fluid from master cylinder M/C to wheel cylinder W/C to increase the pressure.

(Time t1)

At time t1, the depression of brake pedal BP starts, and it becomes the brake override state. With this, stroke-ensuring increasing quantity ΔPwc is added to command wheel cylinder pressure Pwc_ato. In this case, the valve opening time period of inside gate valve GV-IN is increased to T1 (T1>T0) so as to increase the suction quantity of the hydraulic fluid from master cylinder M/C. The hydraulic fluid of stroke-ensuring increasing quantity ΔPwc is supplied through pump P to wheel cylinder W/C. Consequently, it is possible to ensure the pedal stroke, and also to attain the pressure increase of the wheel cylinder.

(Time t2)

At time t2, the automatic brake control is finished. Motor M is stopped. Inside gate valve GV-IN is closed. Consequently, the process proceeds to the normal control by master cylinder pressure Pmc. Outside gate valve GV-OUT is opened.

[FIG. 14: (b) Control of Valve Opening Degree of Inside Gate Valve (Proportional Valve)]

(Time t0)

At time t0, the automatic brake pressure-increasing control starts. Inside gate valve GV-IN is opened. Inside gate valve GV-IN of FIG. 14 is the proportional valve. The valve opening degree of inside gate valve GV-IN is controlled, and pump P is driven so as to supply the hydraulic fluid from master cylinder M/C to wheel cylinder W/C to attain command wheel cylinder pressure Pwc_ato.

(Time t1)

At time t1, the depression of brake pedal BP starts, and it becomes the brake override state. Stroke-ensuring increasing quantity ΔPwc is added to command wheel cylinder pressure Pwc_ato. In this case, the valve opening degree of inside gate valve GV-IN is increased, relative to a case of only the automatic brake before time t1, so as to increase the quantity of the hydraulic fluid discharged from master cylinder M/C. The valve opening degree is decreased with elapsed time period Tc from pedal stroke start time t1, like FIG. 10 of the first embodiment. With this, pedal stroke S is ensured.

(Time t2)

The operation at time t2 is identical to the operation at time t2 of FIG. 13.

[FIG. 15: (c) Control of Motor Rotational Speed]

(Time t0)

At time t0, the automatic brake pressure-increasing control starts. Inside gate valve GV-IN is opened. The valve opening degree of inside gate valve GV-IN is constant. The rotational speed of pump P is controlled to supply the hydraulic fluid from master cylinder M/C to wheel cylinder W/C so as to attain command wheel cylinder pressure Pwc_ato.

(Time t1)

At time t1, the depression of brake pedal BP starts, and it becomes the brake override state. Stroke-ensuring increasing quantity ΔPwc is added to command wheel cylinder pressure Pwc_ato. In this case, the rotational speed of motor M is increased to N1, relative to a case of only the automatic brake before t1. With this, the quantity of the hydraulic fluid discharged from master cylinder M/C is increased. The rotational speed is decreased with elapsed time period Tc from pedal stroke start time t1 to ensure pedal stroke S, like the first embodiment of FIG. 11.

(Time t2)

The operation at time t2 is identical to the operation at time t2 of FIG. 13.

[FIG. 16: Control of Wheel Cylinder Pressure by Outside Gate Valve]

FIG. 16 is a time chart when the wheel cylinder pressure control is performed by controlling outside gate valve GV-OUT during the automatic brake control, like the second embodiment. In the second embodiment of FIG. 12, the pedal depression during the automatic brake pressure-holding control is shown. FIG. 16 shows the pedal depression during the automatic brake pressure-increasing control. Outside gate valve GV-OUT is the normally-open valve. However, the balance control is not performed in FIG. 16.

(Time t0)

At time t0, the automatic brake pressure-increasing control starts. Pump P is driven. The hydraulic fluid is sucked from master cylinder M/C by opening inside gate valve GV-IN. The normally open outside gate valve GV-OUT is energized, so that the valve opening degree is decreased. With this, the quantity of the hydraulic fluid returned through outside gate valve GV-OUT to master cylinder M/C is decreased, so as to increase the pressure of wheel cylinder W/C.

(Time t1)

At time t1, the depression of brake pedal BP starts, and it becomes the brake override state. With this, stroke-ensuring increasing quantity ΔPwc is added to command wheel cylinder pressure Pwc_ato. In this case, the energization quantity of outside gate valve GV-OUT is decreased to increase the valve opening degree. The quantity of the hydraulic fluid returned to master cylinder M/C is increased. The hydraulic fluid which is not returned to master cylinder M/C, of the hydraulic fluid discharged from master cylinder M/C by the stroke of brake pedal BP is supplied to wheel cylinder W/C to increase wheel cylinder pressure Pwc. The valve opening degree of outside gate valve GV-OUT is controlled so as to satisfy the increasing quantity of wheel cylinder pressure Pwc=stroke-ensuring increasing quantity ΔPwc. Pedal stroke S during the automatic brake control is ensured by the hydraulic fluid returned to master cylinder M/C and the hydraulic fluid of the increasing quantity of wheel cylinder W/C, like the first embodiment.

(Time t2)

The operation at time t2 is identical to the operation at time t2 of the second embodiment.

Effect of Third Embodiment

It is possible to attain the same effect as the first and second embodiments even during the automatic brake pressure-increasing control by adding stroke-ensuring increasing quantity ΔPwc to command wheel cylinder pressure Pwc_at.

Fourth Embodiment

A fourth embodiment is illustrated below. In the third embodiment, the stroke ensuring control is performed during the automatic brake pressure-increasing control. In the fourth embodiment, the stroke ensuring control is performed during the automatic brake pressure-reducing control.

[Depression of Brake Pedal During Automatic Brake Pressure-Reducing Control]

Figure 17:
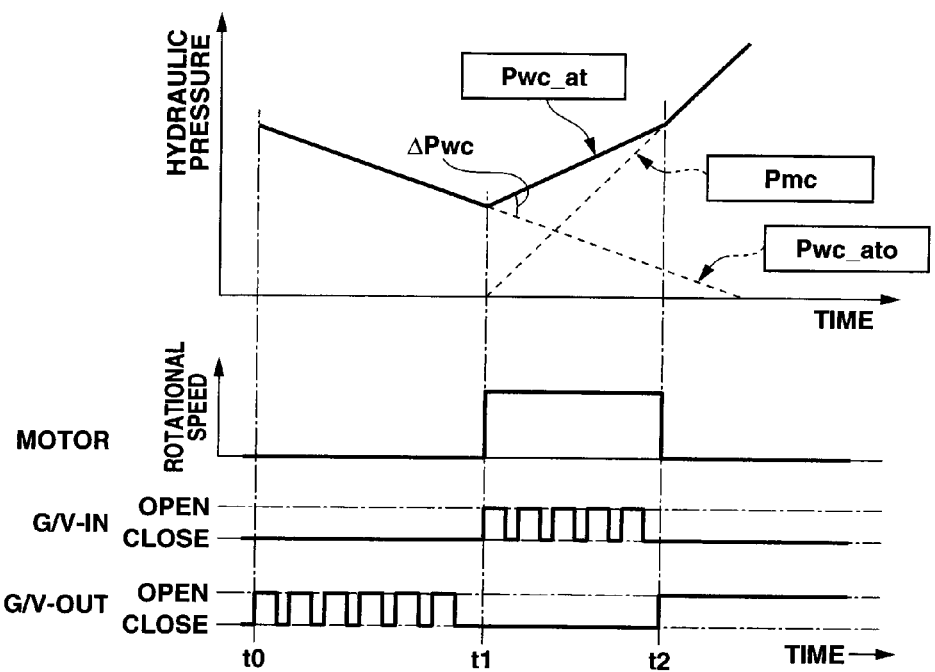
FIG. 17 is a time chart of the stroke ensuring control during a pressure reduction by the automatic brake control (control of the valve opening time period of the inside gate valve (ON/OFF valve).
Figure 18:
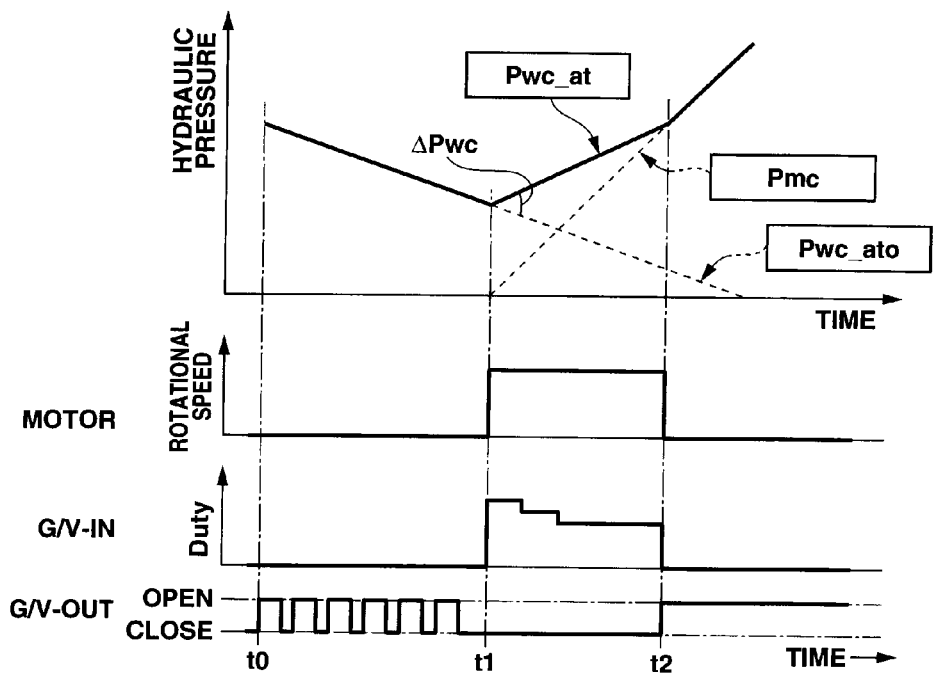
FIG. 18 is a time chart of the stroke ensuring control during the pressure reduction by the automatic brake control (control of the valve opening degree of the inside gate valve (proportional valve)).
Figure 19:
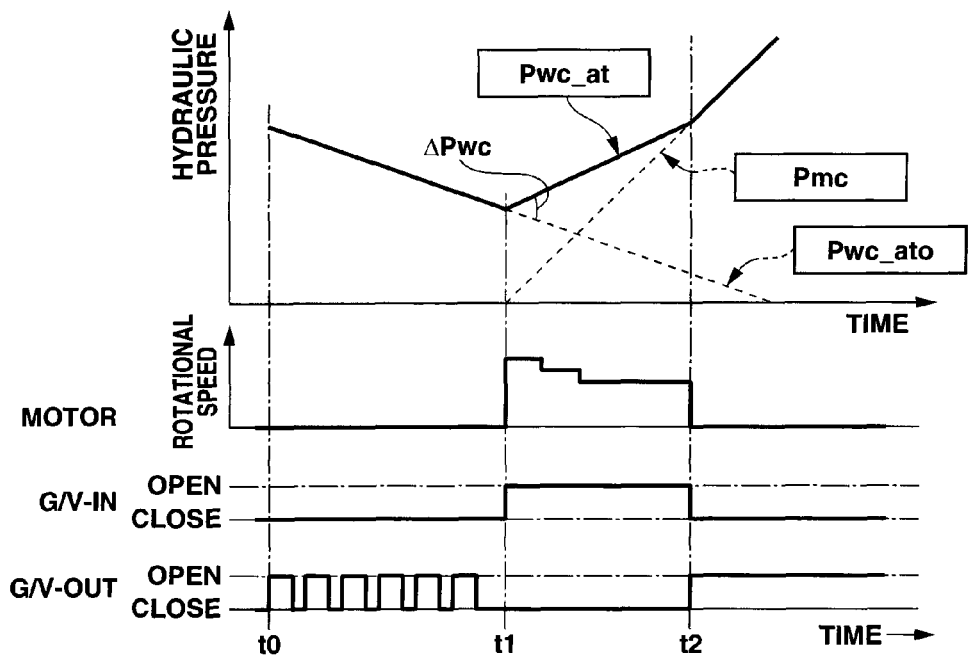
FIG. 19 is a time chart of the stroke ensuring control during the pressure reduction by the automatic brake control (control of the rotational speed of the motor).
Figure 20:
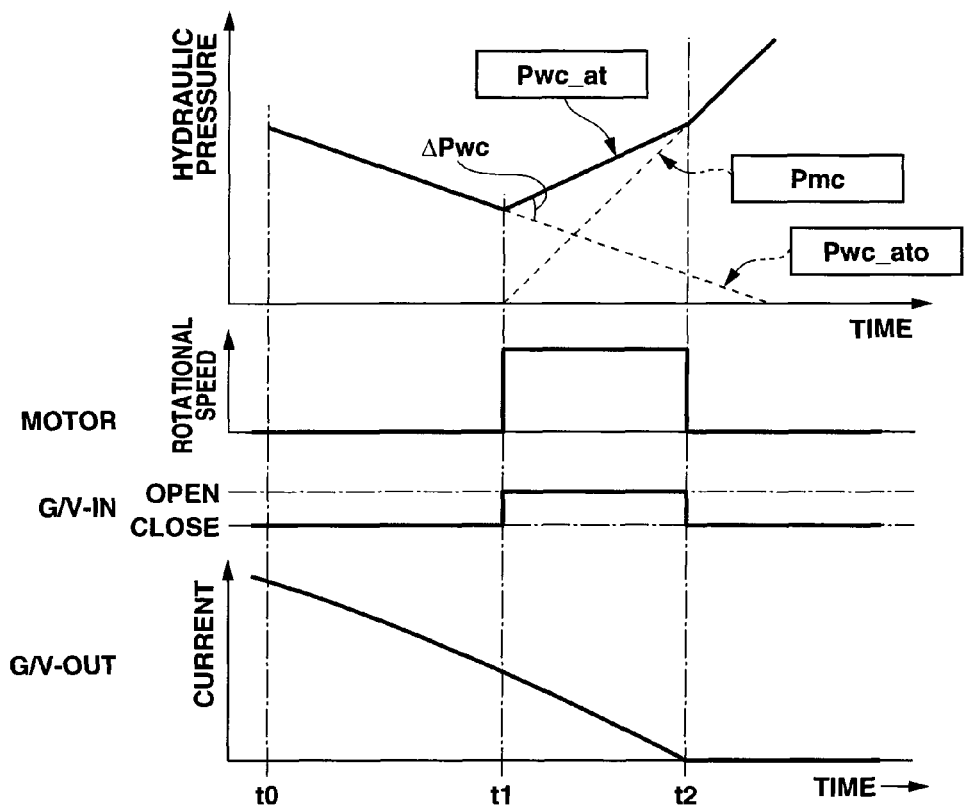
FIG. 20 is a time chart of the stroke ensuring control during the pressure reduction by the automatic brake control (control of the outside gate valve).

FIGS. 17-20 are time charts when brake pedal BP is depressed during the automatic brake pressure-reducing control. FIG. 17 is a time chart when the rotational speed of motor M is constant, inside gate valve GV-IN is used as the ON/OFF valve, and the valve opening time period is controlled (cf. (a)). FIG. 18 is a time chart when the rotational speed of motor M is constant, inside gate valve GV-IN is used as the proportional valve, and the valve opening degree is controlled (cf. (b)). FIG. 19 is a time chart when the rotational speed of motor M is controlled, and inside gate valve GV-IN is held in the open state. FIG. 20 is a time chart when outside gate valve GV-OUT is controlled in the valve opening direction, like the second embodiment. Like the third embodiment, the above-mentioned four control methods are illustrated.

[FIG. 17: (a) Control of Valve Opening Time Period of Inside Gate Valve (ON/OFF Valve)]

(Time t0)

At time t0, the automatic brake pressure-reducing control starts. Outside gate valve GV-OUT is opened. Consequently, the hydraulic fluid is returned from wheel cylinder W/C to master cylinder M/C. Wheel cylinder pressure Pwc is decreased in accordance with command wheel cylinder pressure Pwc_ato.

(Time t1)

At time t1, the depression of brake pedal BP starts, and it becomes the brake override state. Pump P is driven. With this, stroke-ensuring increasing quantity ΔPwc is added to wheel cylinder pressure current value Pwc. In this case, the time period during which inside gate valve GV-IN is in the valve opening state is controlled, so that the suction quantity of the hydraulic fluid from master cylinder M/C is controlled. With this, the hydraulic fluid of stroke-ensuring increasing quantity ΔPwc is supplied through pump P to wheel cylinder W/C.

(Time t2)

At time t2, the automatic brake control is finished. Motor M is stopped. Inside gate valve GV-IN is closed. With this, the process proceeds to the normal control by master cylinder pressure Pmc. Outside gate valve GV-OUT is opened.

[FIG. 18: (b) Control of Valve Opening Degree of Inside Gate Valve (Proportional Valve)]

(time t0)

The operation at time t0 is identical to the operation at time t0 of FIG. 17.

(Time t1)

At time t1, the depression of brake pedal BP starts, and it becomes the brake override state. Stroke-ensuring increasing quantity ΔPwc is added to wheel cylinder pressure current value Pwc. In this case, the valve opening degree of inside gate valve GV-IN is controlled, so that the valve opening degree is decreased with elapsed time period Tc from pedal stroke start time t1. The valve opening degree is decreased in accordance with elapsed time period Tc from pedal stroke start time t1, like the first embodiment of FIG. 10. Accordingly, pedal stoke S is ensured.

(Time t2)

The operation at time t2 is identical to the operation at time t2 of FIG. 17.

[FIG. 19: (c) Control of Rotational Speed of Motor]

(Time t0)

The operation at time t0 is identical to the operation at time t0 of FIG. 17.

(Time t1)

At time t1, the depression of brake pedal BP starts, and it becomes the brake override state. Stroke-ensuring increasing quantity ΔPwc is added to wheel cylinder pressure current value Pwc. In this case, the rotational speed of motor M is controlled to ensure pedal stroke S. The rotational speed is decrease with elapsed time period Tc from pedal stroke start time t1.

(Time t2)

The operation at time t2 is identical to the operation at time t2 of FIG. 17.

[FIG. 20: Control of Wheel Cylinder Pressure by Outside Gate Valve]

FIG. 20 is a time chart when outside gate valve GV-OUT is controlled during the automatic brake control to perform the wheel cylinder pressure control like the third (second) embodiment.

(Time t0)

At time t0, the automatic brake pressure-reducing control starts. The normally open outside gate valve GV-OUT is energized to control the valve opening degree, so that the return (recirculating) quantity from outside gate valve GV-OUT to mater cylinder M/C is controlled. The valve opening degree is increased by decreasing the energization quantity so as to increase the return quantity. Accordingly, the pressure of wheel cylinder W/C is decreased, and command wheel cylinder pressure Pwc_ato is attained.

(Time t1)

At time t1, the depression of brake pedal BP starts, and it becomes the brake override state. Stroke-ensuring increasing quantity ΔPwc is added to wheel cylinder pressure current value Pwc. In this case, the energization quantity of outside gate valve GV-OUT is decreased to increase the valve opening degree, so that the quantity of the hydraulic fluid returned to master cylinder M/C is increased. The hydraulic fluid which is not returned through outside gate valve GV-OUT to master cylinder M/C, of the hydraulic fluid discharged from master cylinder M/C by the stroke of brake pedal BP is supplied to wheel cylinder W/C to increase wheel cylinder pressure Pwc. The valve opening degree of outside gate valve GV-OUT is controlled so as to satisfy the increasing quantity of wheel cylinder pressure Pwc=stroke-ensuring increasing quantity ΔPwc. Pedal stroke S during the automatic brake control is ensured by the hydraulic fluid returned to master cylinder M/C and the hydraulic fluid of the increasing quantity of wheel cylinder W/C, like the first embodiment.

(Time t2)

The operation at time t2 is identical to the operation at time t2 of the second embodiment.

Effect of Fourth Embodiment

Stroke-ensuring increasing quantity ΔPwc is added to wheel cylinder pressure current value Pwc, and accordingly it is possible to attain the same effect as the first and second embodiments.

Fifth Embodiment

A fifth embodiment is illustrated below. In this fifth embodiment, the stroke ensuring control is performed during the automatic brake pressure-holding control, like the first embodiment. In the first embodiment, inside gate valve GV-IN is opened (cf. FIGS. 9-11). In the fifth embodiment, the rotational speed of the motor is controlled to ensure the stroke, irrespective of inside gate valve GV-IN.

Figure 21:
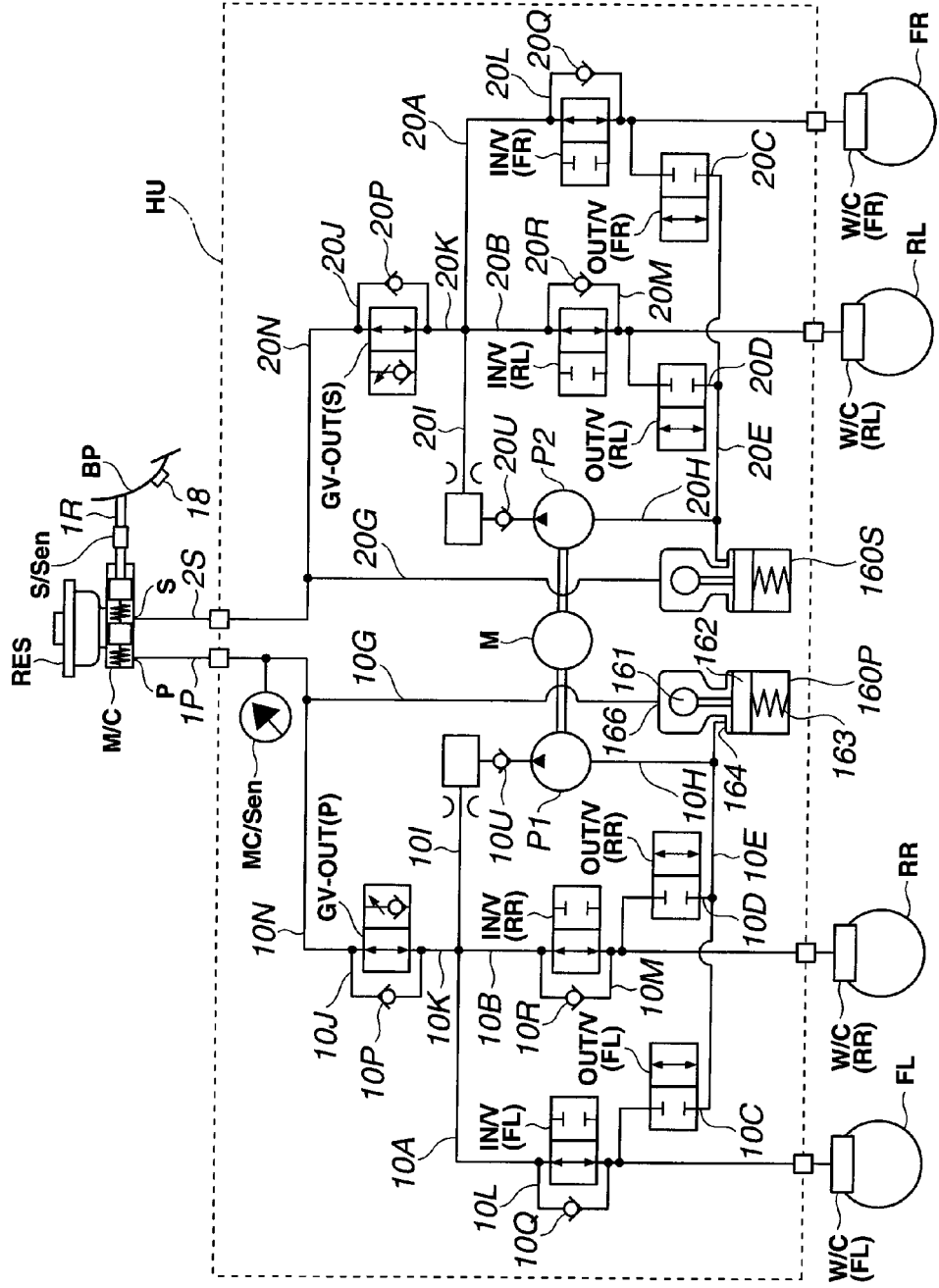
FIG. 21 is a hydraulic circuit of a brake control apparatus according to a fifth embodiment of the present invention.

FIG. 21 is a hydraulic circuit according to the fifth embodiment of the present invention. In this fifth embodiment, inside gate valves GV-IN are omitted, and reservoirs 160P and 160S having check valve function are provided, respectively, in suction circuits 10G and 20G, unlike the first-fourth embodiments.

Reservoirs 160P and 160S have an identical structure. Accordingly, only reservoir 160P is illustrated in detail. This reservoir 160P includes a port 164 connected through return circuit 10E with the downstream portions of pressure reducing valves OUT/V (FL) and OUT/V (RR), and a master cylinder port 166 connected through suction circuit 10G to master cylinder M/C.

Port 164 is connected through suction circuit 10H with the suction side of first pump P1. Reservoir 160P includes a piston 162 arranged to be urged by a return spring 163, and a check valve 161 arranged to be operated (moved) integrally with piston 162.

For example, in case of the pressure reducing operation such as ABS control, the driver depresses brake pedal BP greatly. The master cylinder pressure is acted to check valve 161. Accordingly, check valve 161 is closed (return spring 163 is pushed in the downward direction by piston 162).

In this case, pressure reducing valve OUT/V (RR) is opened, and first pump P1 is acted (operated) to decrease the pressure of wheel cylinder W/C (RR) of the right rear wheel. The hydraulic fluid within wheel cylinder W/C (RR) flows through return circuit 10E and port 164 to reservoir 160P, and is supplied from port 164 through suction circuit 10H to first pump P1 by the suction of first pump P1.

Piston 162 has an effective pressure receiving area larger than an effective pressure receiving area of check valve 161. Accordingly, even when the master cylinder pressure is high, check valve 161 is pushed in the upward direction when first pump P1 is operated for the suction, and held in a balance position. Therefore, the hydraulic fluid is sucked from the master cylinder.

[Variation with Time in Fifth Embodiment]

Figure 22:
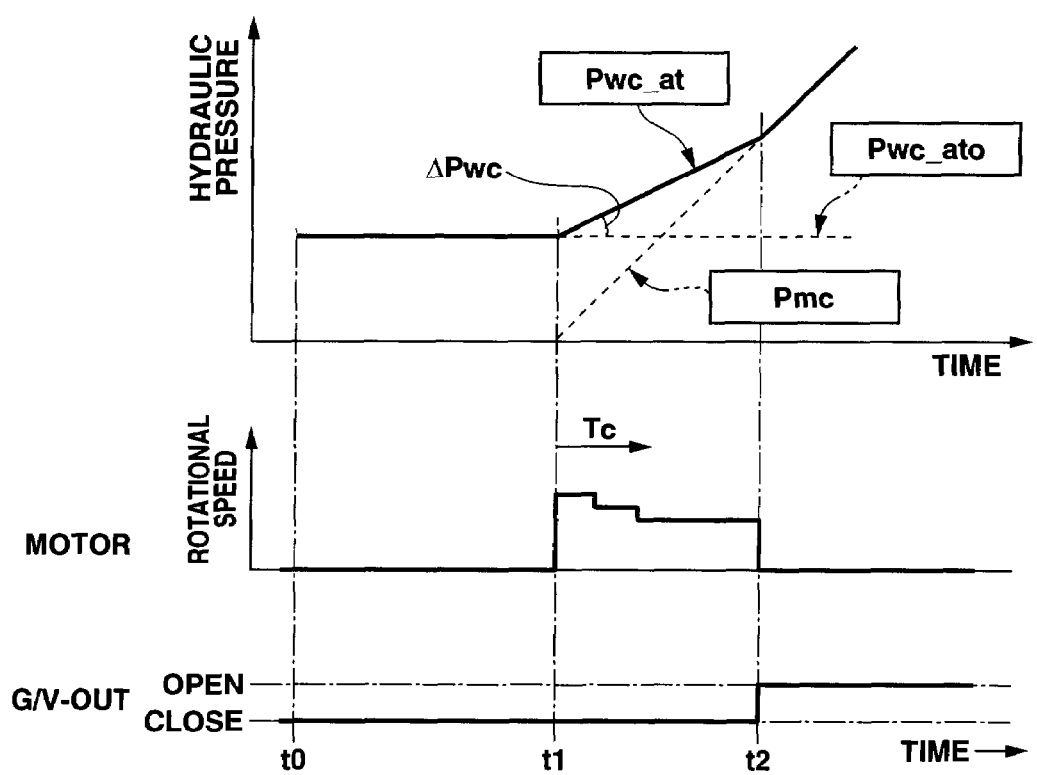
FIG. 22 is a time chart of the stroke ensuring control during the pressure holding (control of the rotational speed of the motor).

FIG. 22 is a time chart of the stroke ensuring control in the fifth embodiment. FIG. 22 shows the stroke ensuring control during the automatic brake pressure-holding control. Outside gate valve GV-OUT is in the closed state by the balance control (cf. FIG. 2) during the automatic brake control.

(Time t0)

The operation at time to is identical to the operation at time t0 of FIG. 9.

(Time t1)

At time t1, the depression of brake pedal BP starts. It becomes the brake override state. With this, stroke-ensuring increasing quantity ΔPwc is added to command wheel cylinder holding pressure Pwc_ato. In this case, the rotational speed of the motor is controlled to decrease the rotational speed with elapsed time period Tc from pedal stroke start time t1. With this, the quantity of the hydraulic fluid supplied from master cylinder M/C to wheel cylinder W/C by pump P is controlled.

(Time t2)

At time t2, the automatic brake control is finished. Motor M is stopped. With this, the process proceeds to the normal control by master cylinder pressure Pmc. Outside gate valve GV-OUT is opened.

Effect of Fifth Embodiment

In the fifth embodiment, the rotational speed of the motor is controlled to ensure the stroke, irrespective of inside gate valve GV-IN. With this, it is possible to obtain the same effects as the first embodiment, even in a case in which there is not provided inside gate valve GV-IN.

Sixth Embodiment

A sixth embodiment is illustrated below. In this sixth embodiment, the hydraulic circuit is varied, unlike the first-fifth embodiments. In the first embodiment, the hydraulic circuit is configured to perform the automatic brake control to all of the four wheels. In this sixth embodiment, the hydraulic circuit is configured to perform the automatic brake control only to two wheels. Accordingly, the sixth embodiment is applicable to a vehicle in which the automatic brake control is performed only to the rear wheels or the front wheels, a motorcycle and so on. In the sixth embodiment, the present invention is applied to the motorcycle.

[Hydraulic Circuit in Sixth Embodiment]

Figure 23:
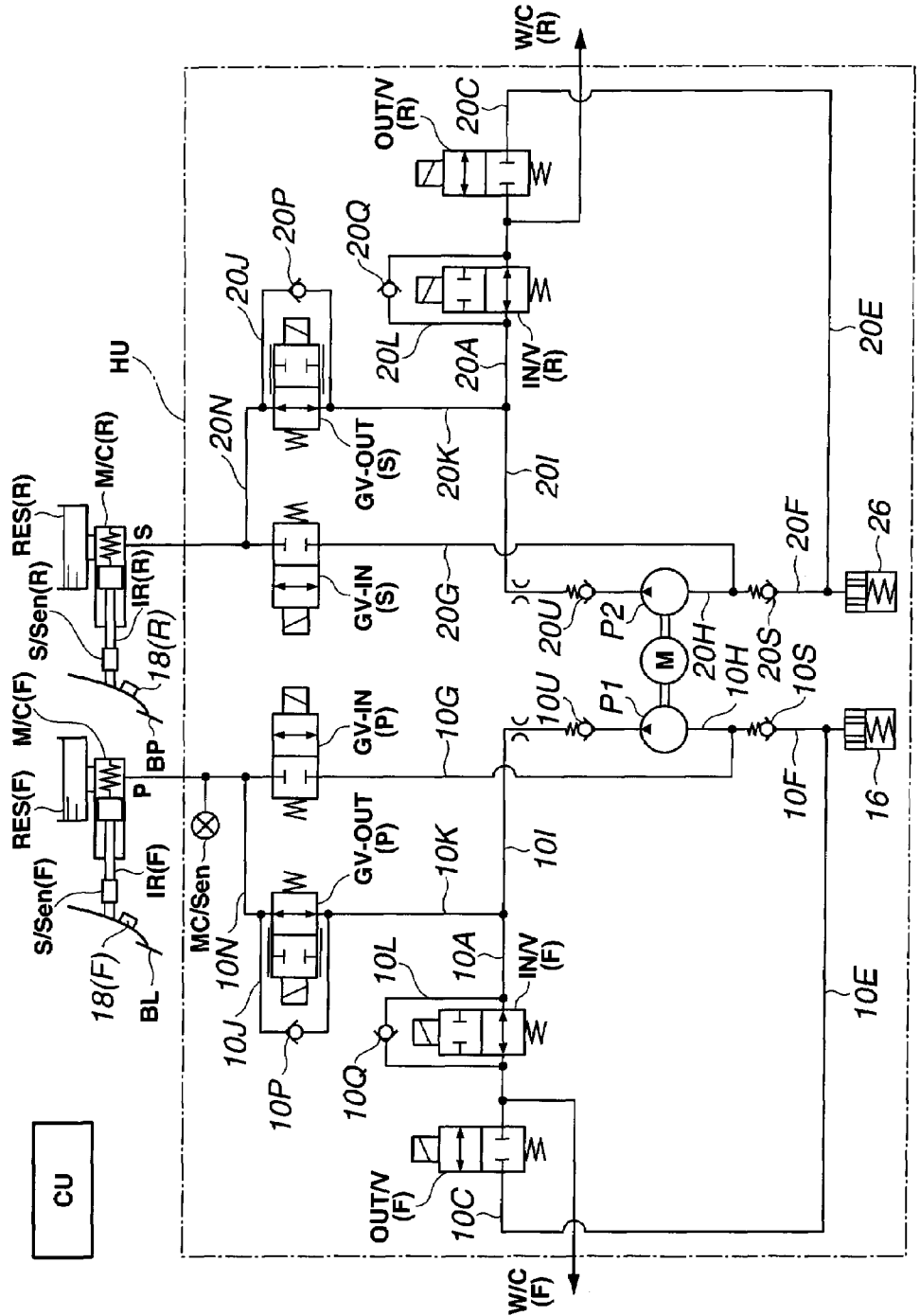
FIG. 23 is a hydraulic circuit of a brake control apparatus according to a sixth embodiment of the present invention.

FIG. 23 is a hydraulic circuit according to the sixth embodiment of the present invention. The hydraulic circuit according to the sixth embodiment is for the motorcycle. Therefore, there are provided two master cylinders M/C (F), M/C(R) for the front wheel and the rear wheel. The master cylinders M/C(F), M/C(R) are provided independently into a P system and an S system. The P system is connected with front wheel F. The S system is connected with rear wheel R.

Pressure increasing valve IN/V (RL, RR) of wheels RL, RR and pressure reducing valves OUT/V (RL, RR) in the first embodiment are omitted. The FL wheel system is connected with front wheel F of the motorcycle. The FR wheel system is connected with rear wheel R. Outside gate valves GV-OUT are opened to connect master cylinders M/C (F), M/C (R) of the front wheel and the rear wheel, respectively, to wheel cylinders W/C (F), W/C (R) of the front wheel and the rear wheel.

A front wheel brake lever BL includes a brake switch 18(F) arranged to sense the operation of the brake, and a stroke sensor S/Sen (F) arranged to sense the stroke. A rear wheel brake pedal BP includes a brake switch 18 (R) arranged to sense the operation of the brake, and a stroke sensor S/Sen (R) arranged to sense the stroke. The valve operations (movements) in the normal state, in the ABS control, in the vehicle behavior control, and in the automatic brake control are identical to the operations in the hydraulic circuit in the first embodiment.

[Stroke Ensuring Control in Sixth Embodiment]

In the sixth embodiment, there are provided two master cylinders M/C. Accordingly, the pressure increasing control of stroke-ensuring increasing quantity ΔPwc is different from the control in the first embodiment. For example, in a case in which the driver's input is inputted only to front wheel F, and is not inputted to rear wheel R, it is necessary to ensure the stroke of front wheel brake lever BL, and however it is not necessary to ensure the stroke of rear wheel brake pedal BP.

In the sixth embodiment, pump P is commonly used for front and rear wheels F, R. When pump P sucks the hydraulic fluid from the front wheel master cylinder M/C (F) to ensure the stroke of front wheel brake lever BL, the hydraulic fluid is also sucked from rear wheel master cylinder M/C (R). Consequently, rear wheel brake pedal BP performs the stroke.

Accordingly, in a case in which the operation is inputted to front wheel brake lever BL and the operation is not inputted to rear brake pedal BP, the valve opening degree of outside gate valve GV-OUT (S) of the S system (rear wheel R side) is increased, and the redundant discharge pressure is returned to rear wheel master cylinder M/C (R).

Effect of Sixth Embodiment

Even in case of the vehicle in which the automatic brake control is performed only to the rear wheel or the front wheel, the motorcycle or so on, it is possible to obtain the same effects as the first to fourth embodiments.

The entire contents of Japanese Patent Application No. 2008-165289 filed Jun. 25, 2008 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A brake control apparatus comprising:
   a master cylinder;
   a wheel cylinder;
   a hydraulic pressure source arranged to supply a hydraulic fluid sucked from the master cylinder to the wheel cylinder, and to increase a pressure of the wheel cylinder;
   a control valve arranged to increase or reduce the pressure of the wheel cylinder;
   an outside gate valve arranged to connect or disconnect between the master cylinder and the wheel cylinder;
   a brake operation sensing section configured to sense a driver's brake operation; and
   a control unit configured
      to control the hydraulic pressure source, the control valve, and the outside gate valve,
      to perform an automatic-brake pressure-increasing control to control the outside gate valve in a valve closing direction, to drive the hydraulic pressure source, and thereby to increase the pressure of the wheel cylinder in accordance with a vehicle condition,
      to judge whether or not a pressure of the master cylinder is smaller than the pressure of the wheel cylinder, and to increase a driving quantity of the hydraulic pressure source when a brake operation is sensed during the automatic-brake pressure-increasing control and the pressure of the master cylinder is smaller than the pressure of the wheel cylinder.

2. The brake control apparatus as claimed in claim 1, wherein the control unit is further configured to perform an automatic brake pressure-holding control to control the outside gate valve in the valve closing direction, to stop the hydraulic pressure source, and to hold the pressure of the wheel cylinder; and the control unit is further configured to drive the hydraulic pressure source when the brake operation is sensed during the automatic brake pressure-holding control, and to suck the hydraulic fluid from the master cylinder.

3. The brake control apparatus as claimed in claim 1, wherein the control unit is further configured to perform an automatic brake pressure-reducing control to control the outside gate valve in a valve opening direction, to stop the hydraulic pressure source, and to reduce the pressure of the wheel cylinder; and the control unit is further configured to drive the hydraulic pressure source when the brake operation is sensed during the automatic brake pressure-reducing control, and to suck the hydraulic fluid from the master cylinder.

4. A brake control method comprising:
performing an automatic brake control including:
  a pressure increasing control to suck a hydraulic fluid from a master cylinder at least by a hydraulic pressure source, and to increase a pressure of a wheel cylinder by the hydraulic fluid from the master cylinder in accordance with a vehicle condition;
  a pressure holding control to hold the increased pressure of the wheel cylinder; and
  a pressure reducing control to reduce the pressure of the wheel cylinder;
sensing a driver's depression of a brake pedal during the automatic brake control;
judging whether or not a pressure of the master cylinder is smaller than the pressure of the wheel cylinder; and
flowing the hydraulic fluid in the master cylinder to the wheel cylinder when the driver's depression of the brake pedal is sensed during the automatic brake control and the pressure of the master cylinder is smaller than the pressure of the wheel cylinder.

5. The brake control method as claimed in claim 4, wherein the hydraulic pressure source is configured to flow the hydraulic fluid in the master cylinder to the wheel cylinder.

* * * * *